United States Patent
Kino et al.

(10) Patent No.: US 7,168,735 B2
(45) Date of Patent: Jan. 30, 2007

(54) AIRBAG APPARATUS

(75) Inventors: Masao Kino, Aichi-ken (JP); Tadashi Yamamoto, Aichi-ken (JP); Michiyasu Ito, Aichi-ken (JP); Takanobu Ikeda, Aichi-ken (JP); Tadashi Yamada, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/238,131

(22) Filed: Sep. 29, 2005

(65) Prior Publication Data
US 2006/0066081 A1   Mar. 30, 2006

(30) Foreign Application Priority Data
Sep. 30, 2004 (JP) .............................. 2004-287481
Sep. 30, 2004 (JP) .............................. 2004-287501
Sep. 30, 2004 (JP) .............................. 2004-287558

(51) Int. Cl.
*B60R 21/16* (2006.01)
(52) U.S. Cl. ................................................. 280/730.2
(58) Field of Classification Search ............. 280/730.1, 280/730.2
See application file for complete search history.

(56) References Cited

U.S. PATENT DOCUMENTS 6,318,753 B1*  11/2001  Valkenburg .............. 280/730.2
2005/0062268 A1*  3/2005  Inoue et al. .............. 280/730.2
2005/0121887 A1*  6/2005  Inoue et al. .............. 280/730.2
2006/0131849 A1*  6/2006  Ochiai ...................... 280/730.2
2006/0138756 A1*  6/2006  Ochiai et al. ............. 280/730.2

FOREIGN PATENT DOCUMENTS

| JP | A-2002-249015 | 9/2002 |
| JP | A-2003-11768  | 1/2003 |
| JP | A-2004-203234 | 7/2004 |

* cited by examiner

*Primary Examiner*—Faye M. Fleming
(74) *Attorney, Agent, or Firm*—Posz Law Group, PLC

(57) ABSTRACT

A head protecting airbag is folded up to be housed at an upper part of a window of a vehicle so as to be deployed and inflated downward from the upper part of the window so as to cover an interior side of the window. In the airbag, a plurality of parallel cells adapted to be deployed and inflated by an inflating gas introduced thereinto are provided in parallel with each other below a gas supply passage portion in which the inflating gas flows along a longitudinal direction. In a cell of the parallel cells so provided which is required to deploy quickly, of front and rear partitioning portions, a partitioning portion situated at an upstream side of the gas flowing in the gas supply passage portion is provided such that an end thereof which extends upward from a lower edge portion is disposed so as to form an inlet port between a distal end of a horizontal portion of a downstream side partitioning portion and itself.

4 Claims, 19 Drawing Sheets

AIRBAG APPARATUS

BACKGROUND OF THE INVENTION

1. Field of the Invention

The present invention relates to an airbag apparatus comprising an airbag which is attached to a housing part of a vehicle. Specifically, the present invention relates to a head protecting airbag which is configured so as to be folded up to be housed at an upper part of a window of the vehicle in a state that the periphery of the airbag is covered by a protecting cover of a synthetic resin after folded up so as to deploy and inflate to protrude downward from the housing part to cover an interior side of the window when an inflating gas is introduced thereinto.

2. Related Art

Conventionally, a head protecting airbag which completes its inflation so as to cover an interior side of a window of a vehicle is made to comprise a gas introducing portion which inflates so as to separate an interior wall portion and an exterior wall portion from each other by allowing an inflating gas to be introduced thereinto and a non-introducing portion which keeps the interior and exterior wall portions joined to each other so as not to allow the inflating gas to be introduced thereinto (for example, refer to Japanese Patent Publication No. JP-A-2004-203234).

Then, the gas introducing portion comprises a gas supply passage portion and a plurality of parallel cells. The gas supply passage portion is disposed so as to extend along the longitudinal direction at an upper edge of the airbag and is made to communicate with a connecting port portion which connects to an inflator for supplying the inflating gas. The parallel cells are arranged in parallel in the longitudinal direction in a protecting area of the airbag which protects an occupant and are each formed so as to have an inflating gas inlet port at an upper portion thereof which faces the gas supply passage portion and to extend to a lower edge of the airbag.

These parallel cells are provided so as not only to control the shape of the airbag which has completed the inflation so that the airbag is not inflated spherically but into a plate-like shape by restricting the inflation in a thickness direction but also to generate a tension at the lower edge of the airbag along the longitudinal direction by narrowing the breadth of the airbag in the longitudinal direction so as to restrain the movement of the airbag to the outside of the vehicle even when the cells are brought into interference with the occupant to thereby increase the occupant restraining performance by the airbag.

In addition, the non-introducing portion of the airbag includes a peripheral portion which defines an outer peripheral edge of the airbag and extending partitioning portions which extend upward continuously from a lower edge portion of the peripheral portion which locates at from the lower edge of the airbag so as to partition the parallel cells.

In the conventional head protecting airbag, however, the number of parallel cells arranged in parallel with each other in the longitudinal direction have openings simply disposed open at upper ends thereof to thereby be made to communicate with the interior of the gas supply passage portion.

By this structure, when the inflating gas is introduced into the gas supply passage portion from the connecting port portion to thereby flow from the upstream side to the downstream side along the longitudinal direction within the gas supply passage portion, the inflating gas tends to easily flow linearly, and as a result, the parallel cell at the downstream end deploys most quickly to inflate thick with ease, or the parallel cell which is closest to the connecting port portion tends to deploy quickly to inflate thick with ease.

Namely, with the conventional head protecting airbag, there has been a problem with making the predetermined parallel cell between the upstream side and the downstream side of the gas in the gas supply passage portion is deployed quickly and inflated thick.

Further, as a head protecting airbag apparatus, there has been an airbag apparatus in which a folded airbag is housed at an upper part of a window as a housing part within a compartment of a vehicle in a state that the periphery of the folded airbag is covered by a cover made of a synthetic resin (for example, refer to JP-A-2002-249015 (FIGS. 9 to 14)).

In the above conventional head protecting airbag apparatus, however, the cover that covers the folded airbag is such as to cover the overall periphery of the folded airbag so as to prevent the collapse of the folded airbag from the folded state. Then, an attachment piece portion which attaches the airbag to the housing part side is passed through the cover, and the cover is integrated with the airbag in such a state.

On the other hand, in a conventional airbag apparatus including an airbag and an inflator which is adapted to be installed on a vehicle, the airbag has a cylindrical connecting port portion which introduces an inflating gas from the inflator into the airbag (refer to, for example, JP-A-2003-11768).

Then, this connecting port portion is externally installed on the inflator and is connected to the inflator by being fastened by a clamp.

However, with the connecting construction between the connecting port portion and the inflator by making use of only the clamp, in case the output of the inflator increases as the volume of the airbag increases, there is caused a risk that the connecting port portion is dislodged from the inflator when the inflator is activated, and there still remains a room for improvement in increasing the connection strength.

SUMMARY OF THE INVENTION

The invention was made to solve the problems and an object of the invention is to provide an airbag apparatus which can perform a suitable deployment mode in accordance with its installation position, more specifically, to provide a head protecting airbag which can make a predetermined parallel cell between the upstream side and the downstream side of the inflating gas in the gas supply passage portion deploy quickly and inflate thick.

According to the invention, there is provided a head protecting airbag which is folded up to be housed at an upper part of a window of a vehicle so as to be deployed and inflated downward from the upper part of the window so as to cover an interior side of the window when an inflating gas is introduced thereinto, comprising a gas introducing portion which inflates so as to separate an interior wall portion and an exterior wall portion from each other by allowing the inflating gas to be introduced thereinto, and a non-introducing portion which keeps the interior and exterior wall portions joined to each other so as not to allow the inflating gas to be introduced thereinto, wherein the gas introducing portion comprises a gas supply passage portion which is disposed to extend along a longitudinal direction at an upper edge of the airbag and is made to communicate with a connecting port portion that is connected to an inflator for supplying the inflating gas, and a plurality of parallel cells arranged substantially in parallel with each other in the longitudinal direction which each have an inflating gas inlet port at an upper portion side thereof which faces the gas supply passage portion and which each are formed so as to extend downward to reach a lower edge of the airbag, wherein the non-introducing portion comprises a peripheral portion which defines an outer peripheral edge of the airbag, and extending partitioning portions which extend upward continuously from a lower edge portion of the peripheral portion which locates on the lower edge of the airbag so as to partition the parallel cells, wherein the airbag includes a quick deployable cell as a parallel cell which has the extending partitioning portions disposed at front and rear edges thereof and which is required to inflate and deploy downward quickly, wherein a downstream side extending partitioning portion of the front and rear extending partitioning portions of the quick deployable cell which locates at a downstream side of the inflating gas which flows in the gas supply passage portion has a vertical portion which extends upward from the lower edge portion and a horizontal portion which is disposed to curve from an upper end of the vertical portion along a lower edge of the gas supply passage portion so as to cover an upper end of the quick deployable cell, and wherein an upstream side extending partitioning portion of the front and rear extending partitioning portions of the quick deployable cell which locates at an upstream side of the inflating gas which flows in the gas supply passage portion is arranged such that an upper end thereof which extends upward from the lower edge portion is disposed so as to form the inlet port between a distal end of the horizontal portion of the downstream side extending partitioning portion which is far from the vertical portion and the upper end.

In the head protecting airbag according to the invention, when the inflating gas is introduced into the airbag from the inflator in a state that the airbag is housed at the upper part of the window of the vehicle, the inflating gas flows from the connecting port portion to the gas supply passage portion further to the respective parallel cells, so that the airbag is deployed and inflated downward from the upper part of the window so as to cover the interior side of the window.

Then, the inflating gas, which flows in the gas supply passage portion along the longitudinal direction, flows, in the vicinity of the quick deployable cell, from a position near above an upstream side parallel cell which is adjacent to the quick deployable cell on the upstream side of the inflating gas to a position near above a downstream side parallel cell which is adjacent to the quick deployable cell on the downstream side of the inflating gas via above the quick deployable cell.

As this occurs, in the quick deployable cell, the horizontal portion which extends from the lower edge portion of the downstream side extending partitioning portion via the vertical portion is disposed to extend along the lower edge of the gas supply passage portion so as to cover the upper end of the quick deployable cell, and then, the inlet port into which the inflating gas is introduced is made to open between the distal end of the horizontal portion which is far from the vertical portion and the upper end of the upstream side extending partitioning portion which extends upward from the lower edge portion. Namely, in the quick deployable cell, the gas inlet port at the upper side thereof is made to open such that an open side of the inlet port is made to follow substantially along a vertical direction and is oriented toward the upstream side of the gas at the upper side of the upstream side parallel cell.

By this structure, while the inflating gas, which flows from the position near above the upstream side parallel cell to the position near above the downstream side parallel cell via above the quick deployable cell, attempts to flow from the inlet port in the upper portion of the upstream side parallel cell into the upstream side parallel cell, the gas tends to flow to the inlet port of the quick deployable cell by virtue of inertial force. Then, the inflating gas, which is introduced into the quick deployable cell from the inlet port thereof, flows to a lower end side of the quick deployable cell so as to be guided by the horizontal portion and the vertical portion of the downstream side extending partitioning portion. Furthermore, since the quick deployable cell is closed at the lower end thereof by the upstream side extending portion, the lower edge portion of the peripheral portion and the vertical portion of the downstream side extending portion, the quick deployable cell deploys quickly by the inflating gas flowing to the lower end side of the quick deployable cell to thereby complete the thick inflation thereof.

On the other hand, in the upper stream side parallel cell which is adjacent to the quick deployable cell, since the inflating gas, which flows in from the inlet port of the upstream side parallel cell, flows to the inlet port of the quick deployable cell to thereby reduce the amount of the inflating gas which flows toward the lower end side of the upstream side parallel cell, the timing of completion of thick inflation is delayed to a later time than the quick deployable cell.

Then, the state in which the quick deployable cell deploys and inflates quickly is a state in which the quick deployable cell deploys and inflates more quickly than when an inlet port communicating with the gas supply passage portion is simply opened in the upper end of the quick deployable cell without providing the horizontal portion at the downstream side parallel cell.

Note that in the downstream side parallel cell which is adjacent to the quick deployable cell, since the downstream side parallel cell is located further downstream in the gas supply passage portion than the quick deployable cell except for a case where the cell is disposed at a downstream end of the gas along the gas supply passage portion, the downstream side parallel cell completes deployment and inflation at a later timing than the quick deployable cell.

Consequently, in the head protecting airbag according to the invention, the predetermined cell from the upstream side to the downstream side of the inflating gas in the gas supply passage portion, that is, the quick deployable cell can be deployed quickly to be inflated thick.

DETAILED DESCRIPTION OF THE PREFERRED EMBODIMENTS

First Embodiment

Figure 1:
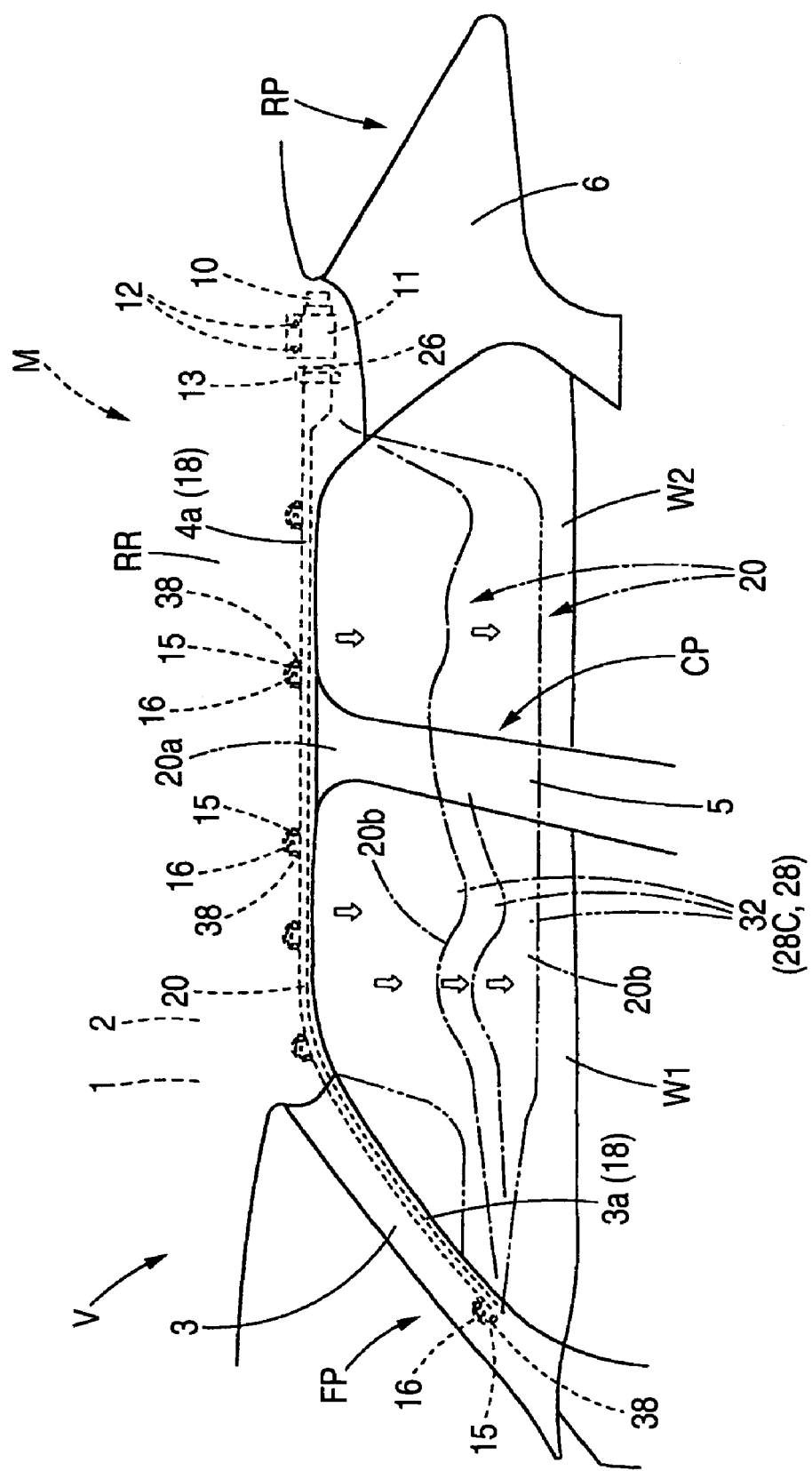
FIG. 1 is a drawing as seen from a compartment which shows a state in which an airbag apparatus utilizing a head protecting airbag of an embodiment of the invention is installed on to a vehicle.
Figure 4:
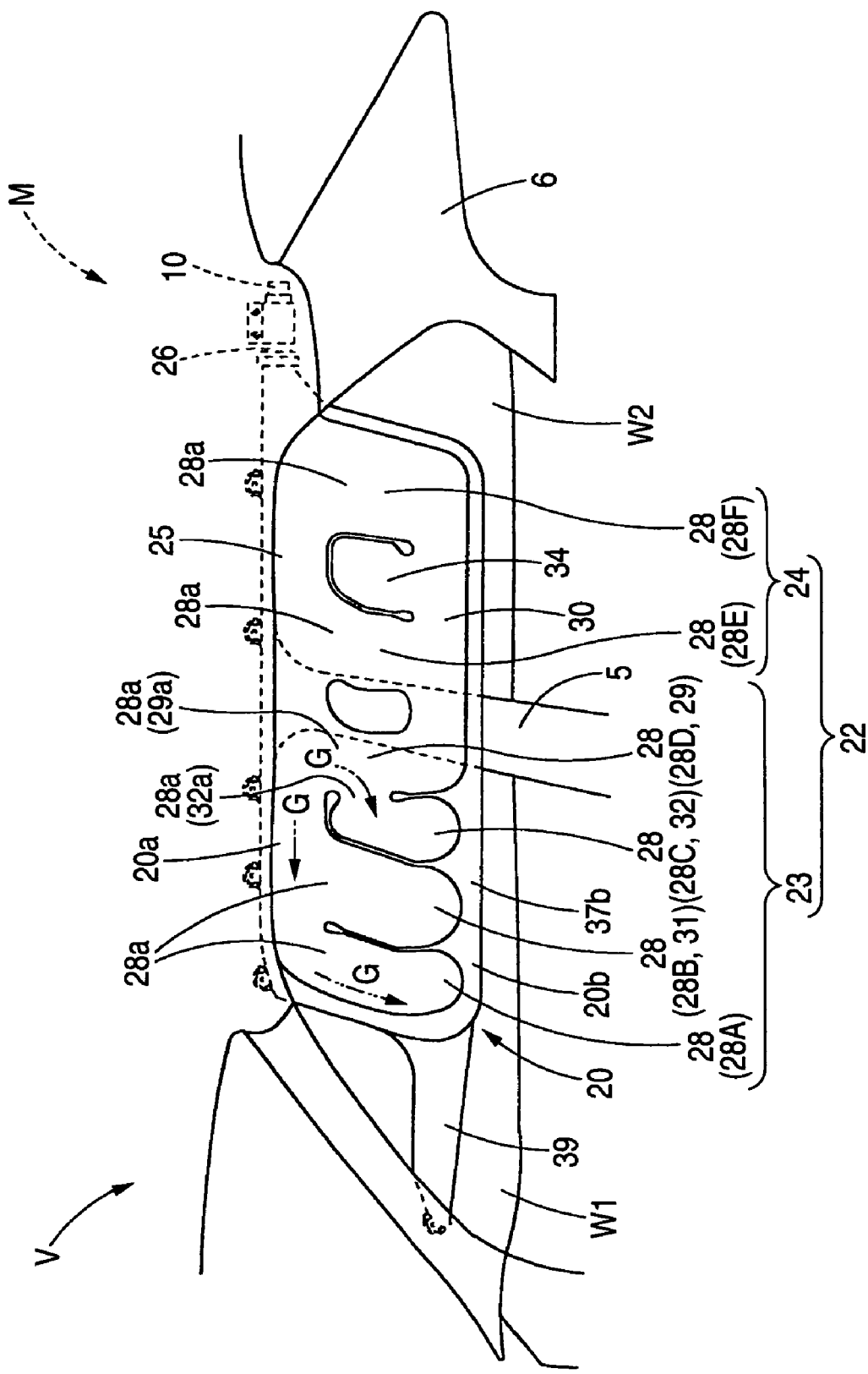
FIG. 4 is a drawing as seen from the compartment which shows a state in which the operation of a heat protecting airbag apparatus of the embodiment has been completed.

Hereinafter, to describe a first embodiment of the invention based on the drawings, as shown in FIGS. 1, 4, a head protecting airbag 20 of the first embodiment is such as to be used in a head protecting airbag apparatus M1 that is to be installed on a vehicle V and is folded up to be housed in a range extending from a position of a front pillar portion FP which faces upper parts of windows W1, W2 (side windows) of the vehicle V to a position on a roof side rail portion RR which is near above a rear pillar portion RP so as to cover the windows W1, W2 when the airbag deploys and inflates downward completely. Note that this vehicle V is constructed so as to have a center pillar portion CP provided between the front pillar portion FP and the rear pillar portion RR so as to extend substantially along the vertical direction, and that the airbag 20 is designed to cover the windows W1, W2, as well as an interior side of a pillar garnish 5 of the center pillar portion CP.

As shown in FIG. 1, the head protecting airbag apparatus M1 includes the airbag 20, an inflator 10 for supplying an inflating gas for the airbag 20, attachment brackets 11, 15 and attachment bolts 12, 16. When installed on the vehicle V, the folded airbag 20 and the inflator 10 are housed while being covered by an airbag cover 18 on interior sides thereof. In the case of this embodiment, the airbag cover 18 is provided with a lower edge 3a of a front pillar garnish 3 which covers an interior side of the front pillar portion FP and a lower edge 4a of a roof lining 4 which covers an interior side of the roof side rail portion RR.

The front pillar garnish 3 and the roof lining 4 are made of resin and are attached to an interior side of an inner panel 2, which is a body 1 side member, at the front pillar portion FP and the roof side rail portion RR with attachment means, not shown. Then, the airbag cover 18, which is provided with these lower edges 3a, 4a, is constructed to be pressed open to the compartment by the airbag 20, so that the airbag 20 is allowed to protrude therethrough into the compartment when it deploys and inflates.

The inflator 10 is formed into a substantially cylindrical shape and a gas discharge port, not shown, is provided at a distal end (front end) thereof for discharging the inflating gas therethrough. Then, a portion of the inflator 10 which is in the vicinity of the distal end which includes a portion which is in the vicinity of the gas discharge port is inserted into a connecting port portion 26 of the airbag 20, and the inflator 10 is connected to the connecting port portion 26 of the airbag 20 by making use of a clamp 13 that is fitted on a part of the connecting port portion 26 which is in the vicinity of a rear end thereof. In addition, the inflator 10 is attached to the inner panel 2 by making use of the attachment bracket 11 for holding the inflator 10 and the attachment bolt 12 for fixing the attachment bracket 11 to the body 1 side inner panel 2.

Note that the installation of the inflator 10 on to the vehicle V is implemented in the form of an airbag assembly in which the inflator 10 and the airbag 20 are assembled into a unit.

Figure 2:
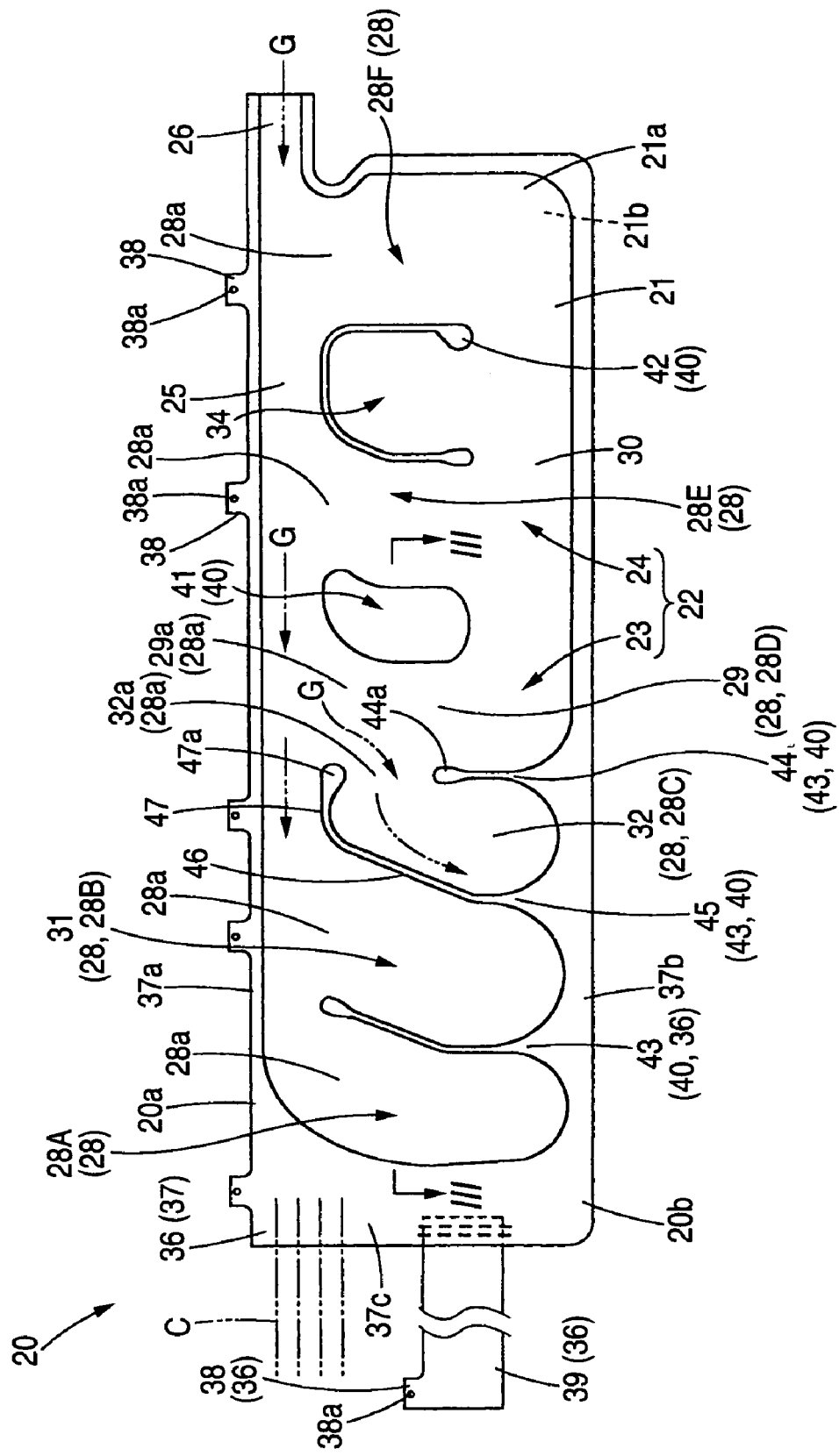
FIG. 2 is a development figure of the airbag of the embodiment.
Figure 3:
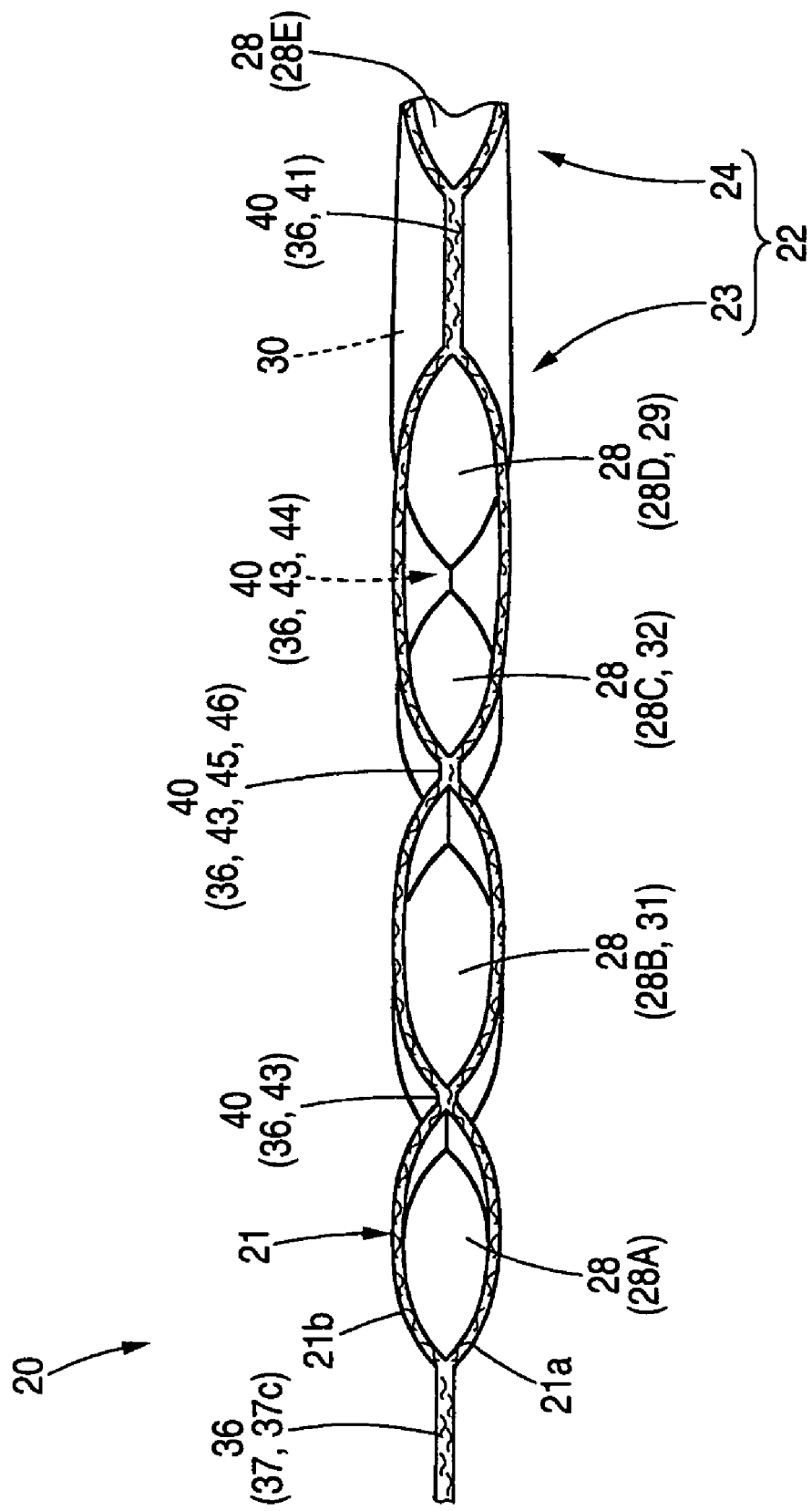
FIG. 3 is a schematic sectional view of a part indicated by the line III—III in FIG. 2.

As shown in FIGS. 2, 3, the airbag 20 is formed into a tubular bag using polyamide threads or polyester threads and is provided with a gas introducing portion 21 which inflates so as to separate an interior wall portion 21a and exterior wall portion 21b from each other by introducing an inflating gas G thereinto and a non-introducing portion 36 which is formed so as connect the wall portions 21a, 21b to each other to thereby prohibit the introduction of the gas G thereinto.

The gas introducing portion 21 includes a protective inflatable portion 22 which constitutes a protecting area of the airbag 20 which covers the windows W1, W2 when completely deployed and inflated, a gas supply passage portion 25 and the connecting port portion 26, whereas the non-introducing portion 36 includes a peripheral portion 37, attachment portions 38, a plate-like portion 39 and partitioning portions 40.

The protective inflatable portion 22 of the gas introducing portion 21 includes a front protecting portion 23 which covers the front side window W1 and a rear protecting portion 24 which covers the rear side window W2 when the airbag 20 has completely deployed and inflated. In addition, the gas supply passage portion 25 is disposed so as to extend in the longitudinal direction on an upper edge 20a side of the airbag 20 to thereby connect the front protecting portion 23 and the rear protecting portion 24 at upper portions thereof. Furthermore, the connecting port portion 26 is provided at a longitudinal end portion of the gas supply passage portion 25, in the case of the first embodiment, at a rear end thereof, and is formed into a cylindrical shape so that the inflating gas G from the inflator 10 is introduced from a rear end side of the gas supply passage portion 25 and is then made to flow toward a front end side of the gas supply passage portion 25.

Then, a plurality of parallel cells 28 are provided in the respective protecting portions 23, 24 so as to be arranged in parallel with each other in the longitudinal direction by being partitioned by the partitioning portions 40, so that the airbag 20, when inflated, is narrowed in width in the longitudinal direction and is restricted in thickness so as to maintain a plate-like shape which extends in the longitudinal direction. Each parallel cell 28 has an inlet port 28a in an upper portion thereof which faces the gas supply passage 25 for introduction of the inflating gas G. Incidentally, in the front protecting portion 23, there are provided four parallel cells 28 (28A, 28B, 28C, 28D), whereas in the rear protecting portion 23, there are provided two parallel cells 28 (28E, 28F).

Note that an inflatable part disposed between the parallel cells 28E, 28F in the rear protecting portion 24 is an auxiliary cell 34, which is designed to inflate by the inflating gas G which is introduced from a communicating portion 30 which makes lower ends of the parallel cells 28E, 28F communicate with each other. The communicating portion 30 extends further forward to communicate with a lower end of the parallel cell 28D at a rear end side of the front protecting portion 23.

Incidentally, since the auxiliary cell 34 is, when the airbag 20 deploys and inflates, pulled while being thinned by the front and rear parallel cells 28E, 28F in association with the deployment thereof as soon as the parallel cells 28E, 28F start to deploy and inflate downward and, after the deployment has been completed, is inflated thick by the inflating gas G introduced from a side thereof which faces the communicating portion 30 at the lower ends of the cells 28E, 28F, the auxiliary cell 34 constitutes a preferable part when it is inserted into a space which is being narrowed at an initial stage of the deployment of the airbag 20 and is inflated thick thereafter so as to form a protecting area.

Then, in the case of the first embodiment, the third parallel cell 28C from the front side is made to constitute a quick deployable cell 32 which functions to complete deployment and inflation quickly, and the fourth parallel cell 28D from the front side is made to constitute an upstream side parallel cell 29 which is situated further upstream along the flow of the inflating gas G which flows in the gas supply passage portion 25 than the quick deployable cell 32, and furthermore, the second parallel cell 28B from the front side is made to constitute a downstream side parallel cell 31 which is situated further downstream along the flow of the inflating gas G which flows in the gas supply passage portion 25 than the quick deployable cell 32.

The peripheral portion 37 of the non-introducing portion 36 is disposed on an outer peripheral edge of the gas introducing portion 21. The plate-like portion 39 is provided in the form of a belt that is disposed at a front end side of the airbag 20 to connect a front end of the airbag 20 to a lower portion of the front pillar portion FP. In the case of the first embodiment, the plate-like portion 39 is provided as being joined to a front edge portion 37c of the peripheral portion 37.

In addition, a plurality of attachment portions 38 are provided so as to protrude upward from an upper edge portion 37a of the peripheral portion 37, and an attachment portion 38 is also provided at a front end of the plate-like portion 39. Attachment holes 38a are provided in the attachment portions 38 for fastening the airbag 20 to the inner panel 2 with bolts 16. An attachment bracket 15 is attached to each attachment portion 38 as a wear plate, and the attachment portion 38 is to be fastened to the inner panel 2 together with the bracket 15 with a bolt 16.

The partitioning portions 40 are provided to partition the parallel cells 28 (28A, 28B, 28C, 28D, 28E, 28F) from each other which are arranged in parallel with each other in the longitudinal direction, and in the case of this embodiment, the portioning portions 40 are provided with three types of partitioning portions such as a broad partitioning portion 41, an inverted U-shaped partitioning portion 42 and an extending partitioning portion 43.

The broad partitioning portion 41 is provided to separate the parallel cell 28D (the upstream side parallel cell 29) from the parallel cell 28E. Then, this broad cell 41 is disposed between the gas supply passage portion 25 and the communicating portion 30 and between the cells 28D, 28E in a state that the broad partitioning portion 41 is spaced away from the peripheral portion 37.

The inverted U-shaped partitioning portion 42 is also provided between the gas supply passage portion 25 and the communicating portion 30 in a state that the inverted U-shaped partitioning portion 42 is spaced away from the peripheral portion 37 and is provided to separate the parallel cell 28E from the parallel cell 28F. This inverted U-shaped partitioning portion 42 is provided so as to form an inverted U-shape so as to surround the auxiliary cell 34.

The extending partitioning portions 43 are provided at three parts; between the parallel cells 28A and 28B, between the parallel cells 28B and 28C, and between the parallel cells 28C and. 28D, and are each provided so as to extend upward from a lower edge portion 37b of the peripheral portion 37. Furthermore, as to the extending partitioning portion 43 at the front and rear of the quick deployable cell 32, a partitioning portion which locates at the upstream side of the inflating gas G which flows in the gas supply passage portion 25 constitutes an upstream side extending partitioning portion 44, and a partitioning portion which locates at the downstream side of the inflating gas G which flows in the gas supply passage portion 25 constitutes a downstream side extending partitioning portion 45.

Then, the downstream side extending partitioning portion 45 includes a vertical portion 46 which extends upward from the lower edge portion 37b of the peripheral portion 37 and a horizontal portion 47 which is disposed to curve from an upper side of the vertical portion 46 along a lower edge of the gas supply passage portion 25 so as to cover an upper end of the quick deployable cell 32.

In addition, the upper side extending partitioning portion 44 is provided such that an upper end 44a, which rectilinearly extends upward from the lower edge portion 37b of the circumferential portion 37, is disposed at a position which is situated directly below to be spaced away from a rear distal end 47a of the horizontal portion 47 of the downstream side extending partitioning portion 45 which is far away from the vertical portion 46 so as to form an inlet port 32a between the distal end 47a and itself.

Next, to describe briefly a process of installing the head protecting airbag apparatus on to the vehicle V, the airbag 20 is folded up substantially vertically from a flat developed state thereof into a bellows while creating creases C (refer to FIG. 2) in parallel with the upper edge 20a such that the lower edge 20b side approaches the upper edge 20a side, and thereafter, a breakable wrapping material, not shown, is wound around the circumference of the airbag 20. Furthermore, the respective attachment portions 38 are pulled out so that the predetermined brackets 15 are attached thereto, and the inflator 10, on which the attachment bracket 11 has already been attached, is inserted into the connecting port portion 26, whereby the connecting port portion 26 is connected to the inflator 10 by the clamp 13, an airbag assembly being thereby formed. Then, the respective brackets 11, 15 are disposed at the predetermined positions on the inner panel 2 and are then fastened with the bolts 12, 14, whereby the airbag assembly can be installed on the vehicle V.

Thereafter, a lead wire which extends from a control unit for controlling the operation of the inflator is connected to the inflator 10, the front pillar garnish 3 and the roof lining 4 are attached to the inner panel 2 on the side of the body 1, and furthermore, the pillar garnish 5 and the rear pillar garnish 6 are attached to the body 1 side inner panel 2, whereby the head protection airbag apparatus M1 can be installed on the vehicle V.

Then, when the inflator of the head protecting airbag apparatus M1 is activated after the installation of the system on to the vehicle V, the inflator 10 generates inflating gas G so that the inflating gas G so generated is introduced into the airbag 20.

Then, the inflating gas G from the inflator 10 is introduced into the head protecting airbag 20 of the first embodiment, which is housed at the upper parts of the windows W1, W2, then, into the gas supply passage portion 25 from the connecting port portion 26, and furthermore into the respective parallel cells 28, the communicating portions 30 and the auxiliary cell 34, the airbag 20 so housed is deployed and inflated downward from the upper parts of the windows W1, W2 so as to cover the interior sides of the windows W1, W2 and the pillar portion CP (refer to FIGS. 1, 2, 4).

As this occurs, as shown in FIG. 2, the inflating gas G, which is flowing forward in the gas supply passage portion 25 along the longitudinal direction, flows, in the vicinity of the quick deployable cell 32, from the from the position near above the upstream side parallel cell 29 which is adjacent to the quick deployable cell 32 to the position near above a downstream side parallel cell 31 which is adjacent to the quick deployable cell 32 via above the quick deployable cell 32.

As this occurs, in the quick deployable cell 32, the horizontal portion 47 of the downstream side extending partitioning portion 45 which extends from the lower edge portion 37b via the vertical portion 46 is disposed so as to cover the upper end of the quick deployable cell 32 along a lower edge of the gas supply passage portion 25, and the inlet port 32a into which the inflating gas G is introduced is made to open between the distal end 47a of the horizontal portion 47 and the upper end 44a of the upstream side extending partitioning portion 44 which extends upward from the lower edge portion 37b. Namely, the quick deployable cell 32 has the upper gas inlet port 32a whose open side is directed along the vertical direction and toward the upstream side of the gas G in the upper portion of the upstream side parallel cell 29.

By this structure, while the inflating gas G which flows from the position near above the upstream side parallel cell 29 to the position near above the downstream side parallel cell 31 via above the quick deployable cell 32 attempts to flow into the upstream side parallel cell 29 from an inlet port 29a in an upper portion of the upstream side parallel cell 29, the inflating gas G tends to flow easily into the inlet port 32a of the quick deployable cell 32 by virtue of inertial force. Then, the inflating gas G which flows into the quick deployable cell 32 from the inlet port 32a of the quick deployable cell 32 flows to the lower end side of the quick deployable cell 32 so as to be guided by the horizontal portion 47 and the vertical portion 46 of the downstream side extending partitioning portion 45 of the quick deployable cell 32. Furthermore, since the quick deployable cell 32 is closed at the lower end by the upstream side extending partitioning portion 44, the lower edge portion 37b of the peripheral portion 37 and the vertical portion 46 of the downstream side extending partitioning portion 45, the quick deployable cell 32 is deployed quickly and inflated thick by the inflating gas G which flows to the lower end side of the quick deployable cell 32.

On the other hand, in the upstream side parallel cell 29 which is adjacent to the quick deployable cell 32, since the inflating gas G introduced from the inlet port 29a of the upstream side parallel cell 29 flows to the inlet port 32a of the quick deployable cell 32 to thereby reduce the amount of the inflating gas which is directed toward a lower end side of the upstream side parallel cell 29, the timing when thick inflation is completed thereat is delayed to a later time than the quick deployable cell 32.

Then, the state in which the quick deployable cell 32 deploys and inflates quickly is a state in which the quick deployable cell 32 deploys and inflates more quickly than when an inlet port communicating with the gas supply passage portion 25 is simply opened in the upper end of the quick deployable cell 32 without providing the horizontal portion 47 at the downstream side parallel cell 45.

Consequently, in the head protecting airbag 20 of the first embodiment, the predetermined cell 28C from the upstream side to down stream side of the gas supply passage portion 25, that is, the quick deployable cell 32 can be deployed quickly and inflated thick.

Incidentally, in the downstream side parallel cell 31 which is adjacent to the quick deployable cell 32, since the downstream side parallel cell 31 is located further downstream in the gas supply passage portion 25 than the quick deployable cell 32 except for a case where the cell 31 is made to constitute the cell 28A which is disposed at a downstream end of the gas along the gas supply passage portion 25, the downstream side parallel cell 31 completes deployment and inflation at a later timing than the quick deployable cell 32.

In a case where the downstream side parallel cell 31 is made to function as the cell 28A at the downstream end of the gas supply passage portion 25, however, the amount of gas introduced into the cell 28A is increased by a front edge portion 37c which constitutes a vertical part of the peripheral portion 37, and since this may lead to a case where the cell 31 deploys and inflates more quickly than the cell 32, the quick deployable cell 32 is, as with the first embodiment, desirably provided in an area where the downstream side parallel cell 31 which is adjacent thereto is disposed below the downstream end of the gas G along the gas supply passage portion 25.

Figure 5:
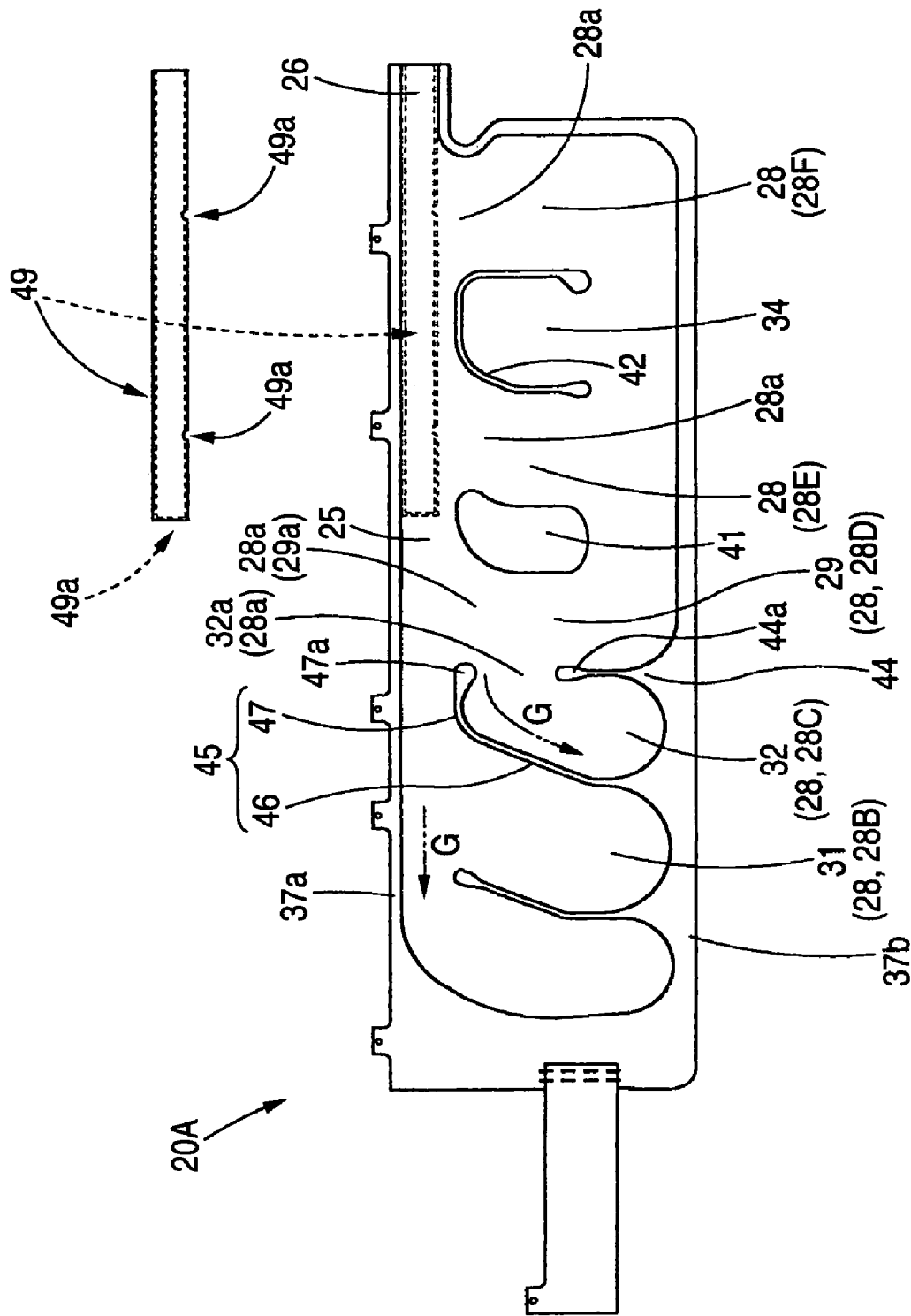
FIG. 5 is a development figure showing a modified example from the airbag of the embodiment.

Note that as with an airbag 20A shown in FIG. 5, a cylindrical inner tube 49, which is made of the same cloth material as that used for the airbag 20, may be provided within the gas supply passage portion 25 with a view to reducing the effect of the heat of the insulating gas G. Gas passage holes 49a are formed in the inner tube 49 at positions corresponding to the inlet ports 28a of the cells 28E, 28F and a front end thereof. Then, this inner tube 49 is disposed from an inner circumferential surface of the connecting port portion 26 to a position near above the broad partitioning portion 41.

In addition, while, in the embodiment, the connecting port portion 26 is described as being provided at the rear end of the gas supply passage portion 25, the airbag 20 may be reversed so that the connecting port portion 26 is provided at the front end side of the gas supply passage portion 25. Furthermore, provided that the inflating gas flows in the gas supply passage portion along the longitudinal direction, the invention can be applied with the connecting port portion disposed in the vicinity of a longitudinally intermediate portion of the gas supply passage portion and a plurality of parallel cells provided along the direction in which the gas flows in the gas supply passage portion.

Furthermore, while, in the first embodiment, only one quick deployable cell 32 is described as being provided in the head protecting airbag 20, a plurality of quick deployable cells may be provided in one head protecting airbag.

Second Embodiment

Figure 6:
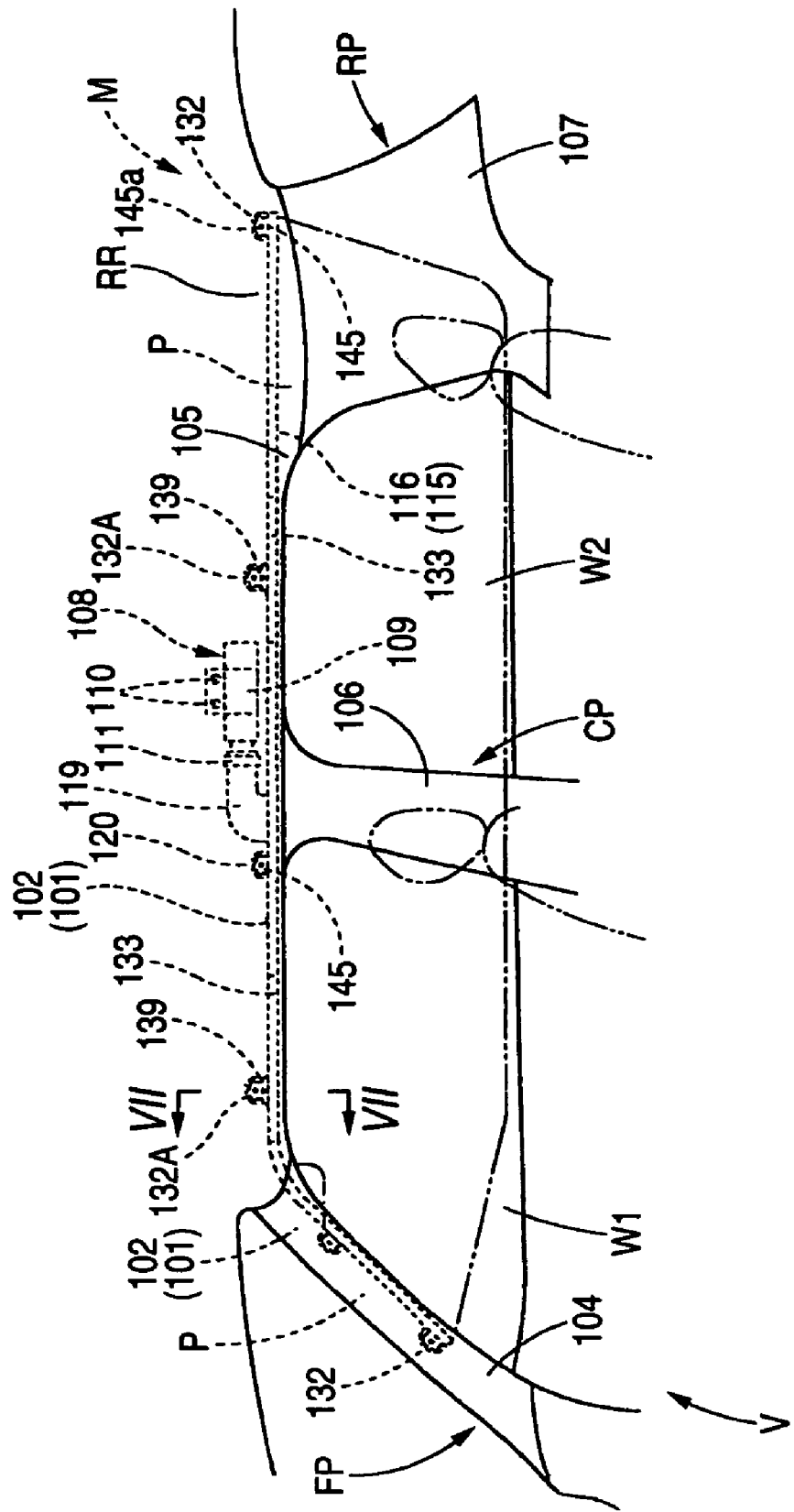
FIG. 6 is a schematic front view as seen from a compartment which shows a head protecting airbag apparatus of an embodiment of the invention.

Hereinafter, a second embodiment of the invention will be described based on the drawings. The second embodiment will be described by taking a head protecting airbag apparatus M2 as shown in FIG. 6 as an airbag apparatus to which the invention can be applied. The head protecting airbag apparatus M2 is such as to be installed on a vehicle V shown in FIG. 6 and is housed at a housing part P which is formed in parts of a front pillar portion FP and a roof side rail portion RR which face upper edges of doors, windows W1, W2 and a rear pillar portion RP which are inside a compartment. Note that this vehicle V is constructed to have a center pillar provided between the front pillar portion FP and the rear pillar portion RP so as to extend substantially along a vertical direction.

The head protecting airbag apparatus M2 is, as shown in FIG. 6 configured to include an inflator 108, attachment brackets 109, 139, 145, attachment bolts 110, 142, an airbag 115 and a protecting cover 133 which is adapted to cover the periphery of the folded airbag 115, and when installed on to the vehicle V, the head protecting airbag apparatus M2 is housed in the housing part P in a state that an interior side of the airbag apparatus is covered by a airbag cover 113. In the case of the embodiment, the airbag cover 113 is provided with a part of a front pillar garnish 104 which faces a lower edge thereof, the front pillar garnish 104 being adapted to cover an interior side of the front pillar portion FP, and a part of a roof lining 105 which faces a lower edge thereof, the roof lining 105 being adapted to cover an interior side of the roof side rail portion RR.

The front pillar garnish 104 and the roof lining 105 are made of a synthetic resin and are attached to an interior side of an inner panel 102 which is a member on a body 1 side or constituting part of the body 1 at the front pillar portion FP and the roof side rail portion RR with attachment means, not shown. Then, these lower edge side parts are constructed so as to be opened to the compartment at lower ends thereof so that the airbag 115 is allowed to protrude when it deploys and inflates.

The inflator 108 is formed into a substantially cylindrical shape and is configured such that a gas discharge port, not shown, is provided at a distal end (front end) thereof to discharge an inflating gas therefrom. Then, a portion of the inflator 108 in the vicinity of the distal end thereof which includes the gas discharge port is inserted into a gas inlet port portion 119 of the airbag 115, whereby the inflator 108 is attached to the airbag by making use of a clamp 111 which is externally installed on a position on the gas inlet port portion 119 which is in the vicinity of a rear end thereof. In addition, the inflator 108 is attached to the inner panel 102 by making use of the attachment bracket 109 which holds the inflator 108 and the attachment bracket 110 which is for fixing the attachment bracket 109 to the body 101 side inner panel 102. Note that the installation of the inflator 108 to the vehicle V is implemented in the form of an airbag assembly unit in which the inflator 108 is assembled to the airbag 115.

The airbag 115 is housed in the housing part P which is formed in the part which extends from the front pillar portion FP which is provided to extend obliquely upward over above the center pillar portion CP to a position of the roof side rail portion RR which locates above the rear pillar portion RP. In the case of the embodiment, the airbag 115 is, as shown in FIG. 6, housed by providing a protecting cover 133 at a part on the roof side rail portion RR which correspond, respectively, to the vicinity of the front pillar portion FP and a rear end portion of the inflator 108. When it completes its deployment and inflation, the airbag 115 is constructed so as to cover interior sides of the windows W1, W2, the center pillar portion CP and the rear pillar portion RP as indicated by chain double-dashed lines in FIG. 6.

The airbag 115 is configured to include an airbag main body 116 which is folded up to be housed in the housing part P, and a plurality of attachment piece portions 132 which protrude from the folded airbag main body 116 so as to attach the airbag 115 to the body 1 side of the vehicle V at the housing part P, and in the case of the embodiment, the airbag main body 116 and the attachment piece portions 132 are formed into an integrated tubular bag using polyester threads and polyamide threads.

The airbag main body 116 is provided with an gas introducing portion 117 where an interior wall portion 117a and an exterior wall portion 117b are separated from each other so as to introduce an inflating gas G thereinto and a non-introducing portion 125 which prohibits the introduction of the inflating gas G thereinto.

In the case of the second embodiment, the gas introducing portion 117 is provided with a gas supply passage portion 118, the gas inlet port portion 119 and a protecting inflatable portion 120. The gas supply passage 118 is provided along a longitudinal direction of the vehicle V on an upper edge 116a side of the airbag main body 116. In addition, the gas supply passage portion 118 is constructed to guide an inflating gas G discharged from the inflator 108 into the protecting inflatable portion 120 provided below the gas supply passage portion 118, and the gas inlet port portion 119, which communicates with the inflator 108, is provided so as to communicate with the gas supply passage portion 118 at a longitudinally intermediate location of the gas supply passage portion 118 and to protrude upward from the airbag main body 116. In the case of the embodiment, the gas inlet port portion 119 is constructed so as to open at a rear end thereof.

The protecting inflatable portion 120 is a part which is provided so as to cover the interior sides of the windows W1, W2 when the airbag 114 deploys and inflates so as to protect the heads of the occupants. The protecting inflatable portion 120 is configured to include a front protecting portion 121 which is provided so as to cover the interior side of the window W1 at a side of a front seat and a rear protecting portion 122 which is provided so as to cover the interior side of the window W2 at a side of a rear seat, and the respective front and rear protecting portions 121, 122 are partitioned by partitioning and joined partitioning portions 128, which will be described later, so as to have a plurality of vertical inflatable portions 123 which are provided in parallel in the longitudinal direction while being made to extend in the vertical direction in respective areas thereof.

The non-introducing portion 125 is provided with the interior wall portion 117a and the exterior wall portion 117b which are joined together, and in the case of the embodiment, the non-introducing portion 125 is provided with a peripheral joined portion 127, the joined partitioning portions 128 and a plate-like portion 129. The peripheral joined portion 127 is provided at an outer peripheral edge part of the airbag main body 116 so as to surround the periphery of the gas introducing portion 117. In addition, a connecting cloth 131 which constitutes a front end side of the airbag main body 116 is connected to a front end of the peripheral joined portion 127.

The plate-like portion 129 is formed into a rectangular shape and is provided below the gas supply passage 118 between the front protecting portion 121 and the rear protecting portion 122. The joined partitioning portions are provided within the areas of the front and rear protecting portions 121, 122 so as to extend from upper edges of the peripheral joined portion 127 and the plate-like portion 129. These joined partitioning portions 128 partition the front and rear protecting portions 121, 122 into the plurality of vertical inflatable portions 123 and are provided to restrict the thickness dimension of the airbag 115 when the airbag 115 completes its inflation.

Figure 11:
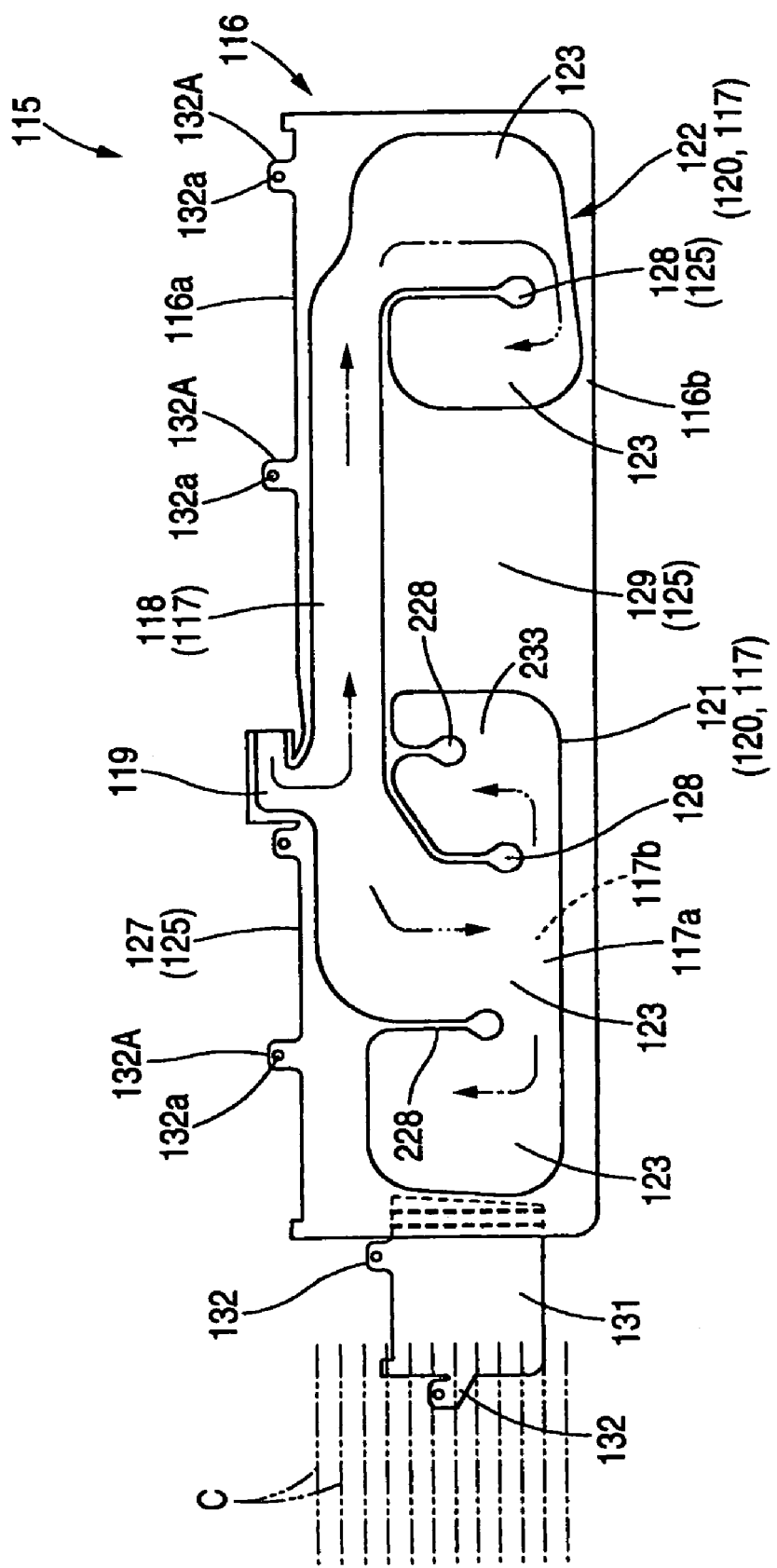
FIG. 11 is a front view showing a state in which an airbag used in the head protecting airbag apparatus of the embodiment is developed flat.

A plurality (six in the embodiment) of attachment piece portions 132 are provided at parts at an upper edge of the peripheral joined portion at an upper edge 116a side of the airbag main body 116 and so as to protrude upward from an upper edge of the connecting cloth 131. An attachment bracket 139, 145 is attached to each attachment piece portion 132 for attaching the airbag 115 to the body 101 side of the vehicle (refer to FIGS. 6 to 10). An attachment hole 132a through which an attachment bolt 142 as a securing structure is passed is formed in each attachment piece portion 132, whereby the attachment piece portion 132 is fixed to the body 101 side inner panel 102 of the vehicle V and an attachment bracket 103 together with the attachment bracket 39, 45 in a state that the attachment bracket 139, 145 is attached thereto using an attachment bolt 142. Then, an attachment piece portion 132A that is provided at a part where the protecting cover 133 is provided is formed so as to protrude higher than the other attachment piece portions 132, as shown in FIG. 11.

Figure 7:
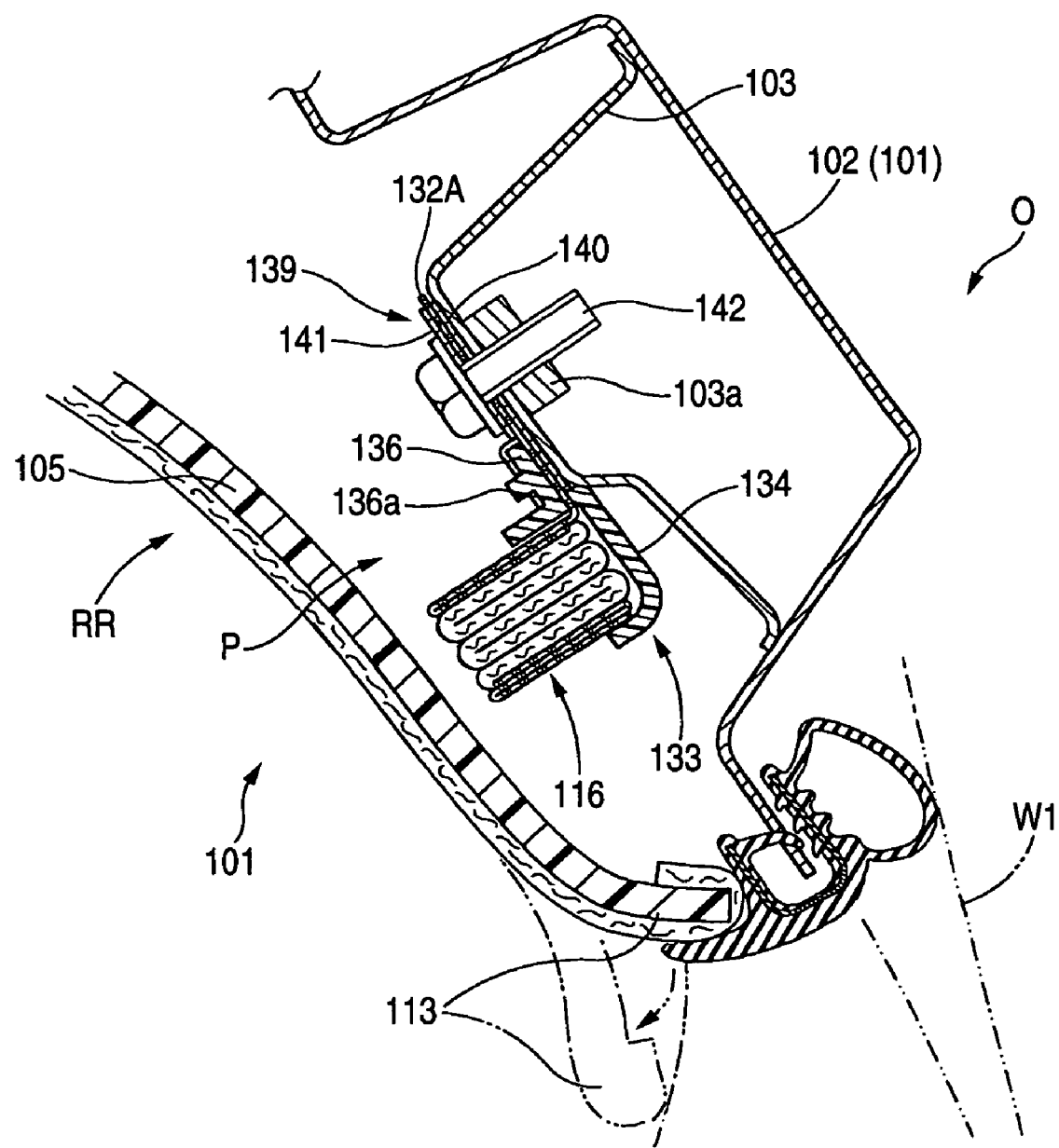
FIG. 7 is a schematic enlarged sectional view of a part indicated by the line VII—VII in FIG. 6.
Figure 8:
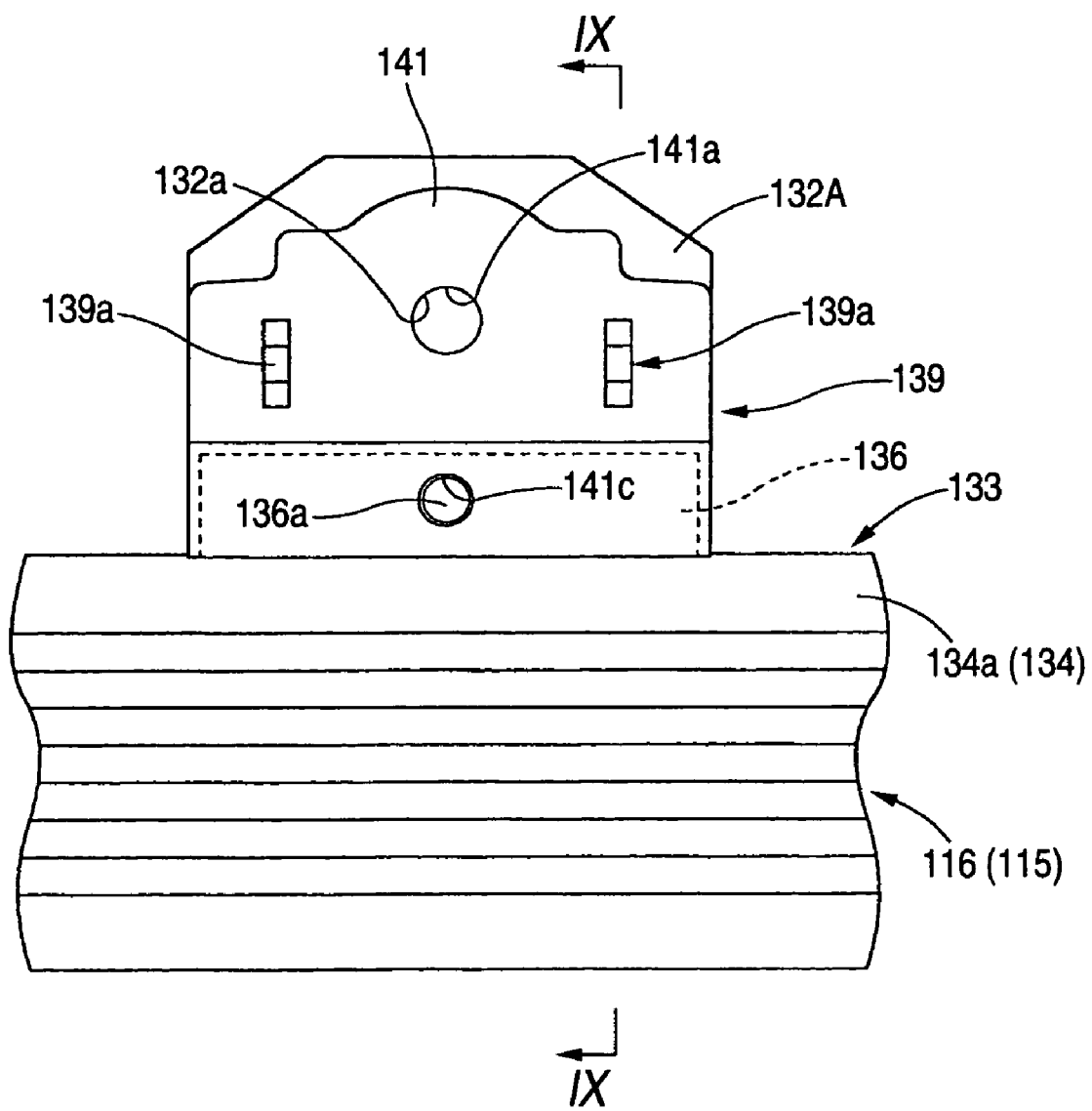
FIG. 8 is a partially enlarged front view of an airbag assembly unit in the head protecting airbag apparatus of the embodiment.
Figure 9:
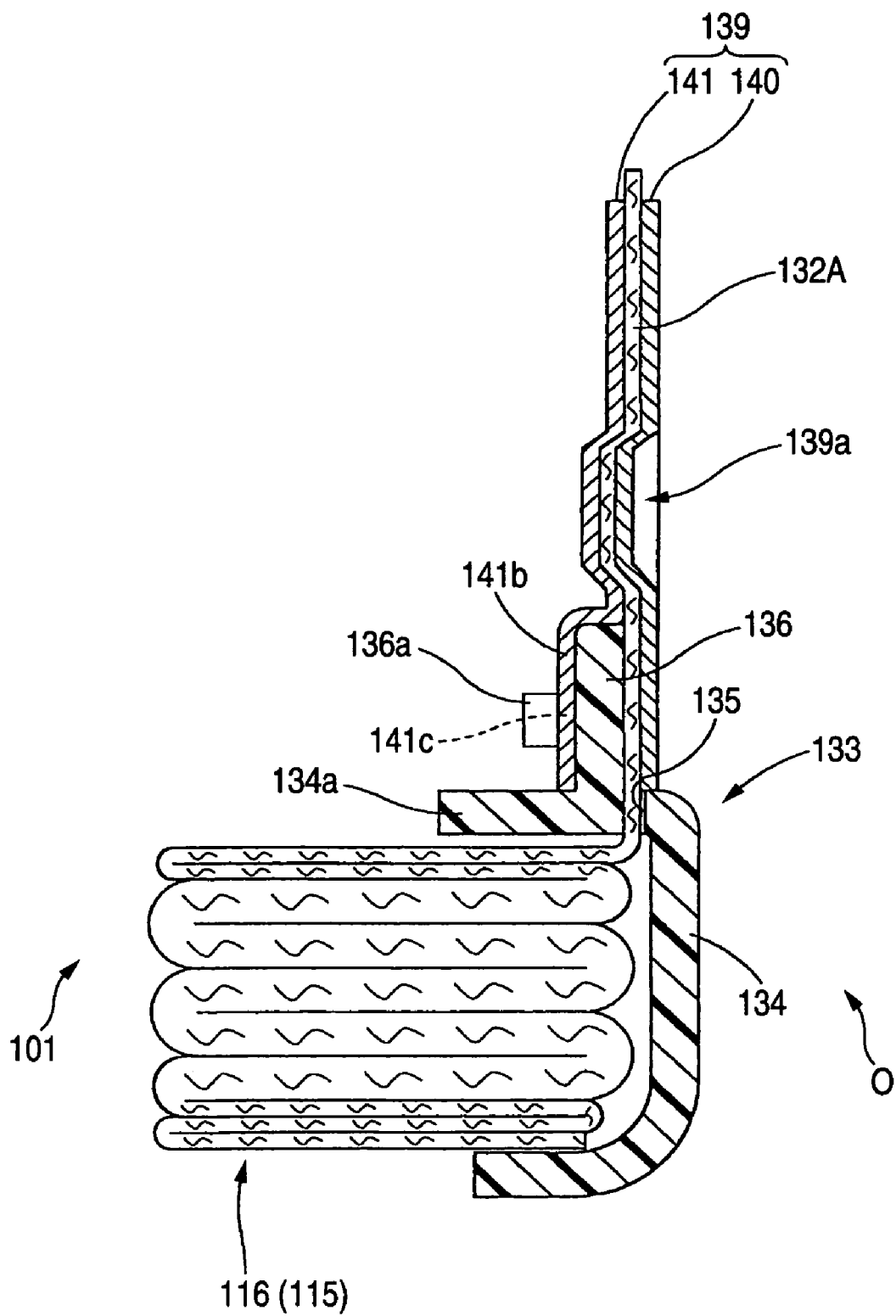
FIG. 9 is a schematic sectional view of a part indicated by the line IX—IX.
Figure 10:
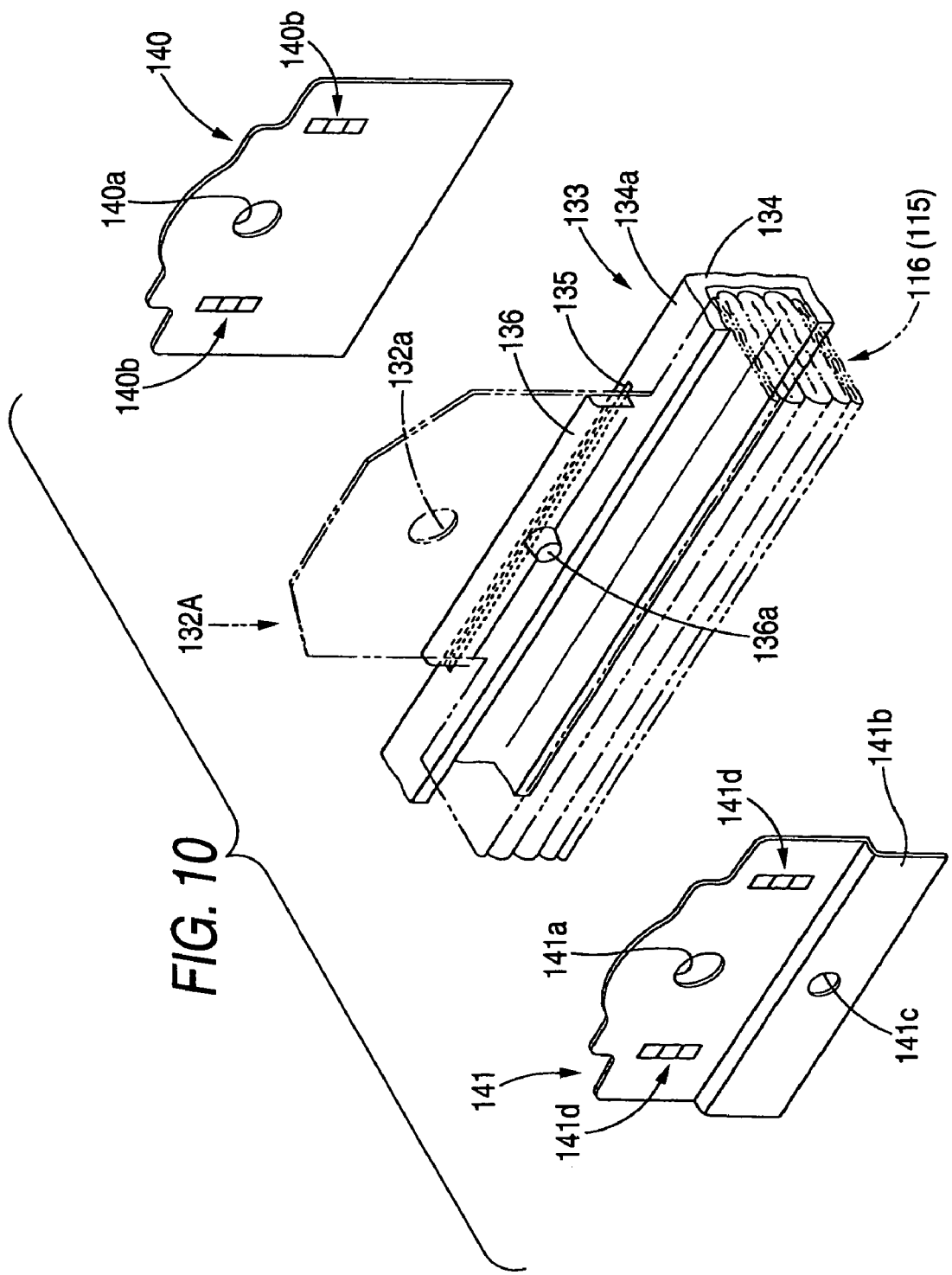
FIG. 10 is an exploded perspective view showing wear plates and a protecting cover in the head protecting airbag apparatus of the embodiment.

The protecting cover 133 is such as to protect at least an exterior side O of part of the folded airbag main body 116 and is, as shown in FIG. 7, provided to protect the airbag 115 from a member such as the attachment bracket 103 of a sheet metal which is provided so as to protrude from the inner panel 102 to an interior side I as a separate unit from the inner panel 102 in order to fix the attachment piece portion 132A of the airbag 115. In the case of the second embodiment, the protecting cover 133 is, as shown in FIG. 6, provided at a part on the roof side rail portion RR which is in the vicinity of the front pillar portion FP and a part which constitutes a rear side of the inflator 108.

The protecting cover 133 is configured to include a cover portion 134 which cover the folded airbag main body 116, a insertion hole 135 through which the attachment piece portion 132A of the airbag 115 is passed and a tongue piece 136 that is formed on a peripheral edge of the insertion hole 135. The cover portion 134 is formed to have a U-like sectional shape, as well as being formed into an elongated shape which extends in the longitudinal direction so as to cover the exterior side O of the folded airbag main body 116. The insertion hole 135 is formed into something like a slit at an upper wall part 134a of the cover portion 134 which is provided above the airbag main body.

The tongue piece 136 is situated adjacent to the interior side I which constitutes the peripheral edge of the insertion hole 135 and is formed into a substantially rectangular plate which is formed so as to extend upward from the upper wall portion 134a, and the width dimension in the longitudinal direction of the tongue piece 136 is set substantially the same as the attachment piece portion 132A (the attachment bracket 139). The tongue piece 136 is a part which is to be held together with the attachment piece portion 132A by an external plate portion 140 and an internal plate portion 141 of the attachment bracket 139, which will be described later, when crimping portions 139a are crimped while the external plate portion 140 and the internal plate portion 141 are applied to front and rear sides of the attachment piece portion 132A. In addition, a substantially cylindrical locking projection 136a adapted to be locked in a locking hole 141 formed in the internal plate portion 141 is provided on the tongue piece 136 so as to protrude from the tongue piece 136 toward the compartment I side (the internal plate portion 141 side) in an orthogonal direction. In the case of the embodiment, the locking projection 136a is provided at a single location which locates in the vicinity of the center of the tongue piece 136.

The attachment bracket 139, which fixes the attachment piece portion 132A to the body 101 side of the vehicle V, is made of a sheet metal and is configured to include the external plate portion 140 and the internal plate portion 141 which are formed to have a substantially rectangular plate-like external shape which is substantially the same as the attachment piece portion 132A in the case of the embodiment. The external plate portion 140 is such as to be disposed on the exterior side O of the attachment piece portion 132A and is configured so as to cover substantially the whole area of the exterior side O of the attachment piece portion 132A except for an upper edge thereof. The external plate portion 140 includes an attachment hole 140a which corresponds to the attachment hole 132a for the passage of the attachment bolt 142 therethrough and also includes deformable portions 140b, 140b which are to constitute the crimping portions 139a on both left and right sides of the attachment hole 140a.

The internal plate portion 141 is such as to be disposed on the interior side I of the attachment piece portion 132A, and the internal plate portion 141 includes an attachment hole 141a which corresponds to the attachment hole 132a for passage of the attachment bolt 142 therethrough and also includes deformable portions 141d, 141d which are to constitute the crimping portions 139a on both left and right sides of the attachment hole 141a. In addition, the internal plate portion 141 is formed to have at a lower end thereof a stepped portion which is made to protrude to the interior side I so that the tongue piece 136 of the protecting cover 133 can be provided between the attachment piece portion 132A and itself. Then, a locking hole 141c is formed in a part where the stepped portion 141b is formed so as to open circularly to thereby allow the passage of the locking projection 136a on the tongue piece 136 therethrough.

In addition, the attachment bracket 139 forms the crimping portions 139a, 139a which protrude to the interior side I at the parts of the deformable portions 140b, 141d which are provided on both the left and right sides of the attachment holes 140a, 141a in a state that the attachment piece portion 132A which is made to protrude from the insertion hole 135 in the protecting cover 133 and the tongue piece 136 are held by the external plate portion 140 and the internal plate portion 141, so that the attachment bracket 139 is attached to the attachment piece portion 132A. At the same time that this occurs, the tongue piece 136 is held by the attachment bracket at the same time and the locking projection 136a is locked on a peripheral edge of the locking hole 141c in the internal plate portion 141, whereby the protecting cover 133 is also attached to the airbag 115 together with the attachment bracket 139.

Note that although not shown, the attachment brackets 145, which are provided at the parts of the other attachment pieces 132, are, as with the wear plate 139, each provided with a pair of wear plates which are formed into a substantially rectangular plate-like shape which is substantially the same as the attachment piece 132 so as to be provided on front and rear sides of the attachment piece portion 132, and the attachment brackets 145 each include attachment holes 145a through which the attachment bolt 142 can be passed at a position corresponding to the attachment hole 132a and are attached to the attachment piece portions 132 by crimping parts at both left and right sides of the attachment holes 145a.

Next, the installation of the airbag apparatus M2 of the embodiment on to the vehicle V. Firstly, the airbag 115 is folded up. To be specific, the airbag main body 116, which is developed flat, is folded into a bellows by sequentially creating ridge-like and groove-like creases C which extend in the longitudinal direction such that a lower edge 116b side of the airbag main body 116 is made to approach the upper edge 116a thereof.

Then, after the airbag main body 116 has been so folded, a predetermined part of the airbag main body 116 is wrapped around by a wrapping material, not shown, which is designed to prevent the collapse of the creases so made, and thereafter, the protecting cover 133 is provided on the periphery of the folded airbag main body 116 such that the attachment piece portion 132A is made to protrude from the insertion hole 135. Next, the attachment brackets 139, 145 are attached to the respective attachment piece portions 132, 126A. In addition, the inflator 108 is connected to the gas inlet port portion 119 by making use of the clamp 111, and following this, the attachment bracket 109 is attached to the periphery of the inflator 108, so that the inflator 108 is attached to the airbag 115, whereby an airbag assembly unit is formed.

Thereafter, the attachment brackets 109, 139, 145 are disposed at the housing part P on the body 101 side of the vehicle so as to be fastened to the inner panel 102 and the attachment bracket 103 with the bolts 109, 142, whereby the airbag assembly unit is attached to the body 101. Next, a lead wire, not shown, which extends from a predetermined control unit for controlling the operation of the inflator is connected to the inflator 108, the front pillar garnish 104 and the roof lining 105 are attached to be fixed to the body 101, and furthermore, a rear pillar garnish 107 and a center pillar garnish 106 are attached to the body 101, whereby the airbag apparatus M2 can be installed on the vehicle V.

When the inflator 108 is activated after the installation of the airbag apparatus M2 on to the vehicle V, the inflating gas G from the inflator 108 is introduced from the gas inlet port portion 119 into the gas supply passage portion 118 as indicated by chain double-dashed lines in FIG. 11. Furthermore, the inflating gas G is introduced from the gas supply passage portion 118 into the protecting inflatable portion 120, whereby the protecting inflatable portion 120 starts to inflate while unfolding the creases. Then, the airbag main body 116 breaks the wrapping material, not shown, and furthermore press opens the airbag cover 113 provided with the lower edges of the front pillar garnish 104 and the roof lining 105 to inflate largely so as to cover the interior sides of the windows W1, W2, the center pillar portion CP and the rear pillar portion PR as indicated by chain double-dashed lines while protruding downward from the housing part P.

Then, in the airbag apparatus M2 of the second embodiment, the protecting cover 134 of the protecting cover 133 is provided around the periphery of the folded airbag 116 such that the attachment piece portion 132A protrudes from the insertion hole 135, and the external plate portion 140 and the internal plate portion 141 are provided on the front and rear sides of the attachment piece portion 132A such that the locking projection 136a which is made to protrude from the tongue piece 136 formed on the interior side I of the insertion hole is inserted in the locking hole 141c in the internal plate portion 141 and are then crimped at the parts of the deformable portions 140b, 141d so as to protrude to the interior side to thereby form the crimping portions 139a, whereby the protecting cover 133 can also be attached easily to the airbag 115 for integration therewith by making use of the attachment bracket 139 at the same time that the attachment bracket 139 is attached to the attachment piece portion 132A. Then, the external plate portion 140 is applied to the attachment bracket 103 at the housing part P, and the attachment bolt 142 as the securing structure is passed through the insertion holes 126a, 140a, 141a and is screwed into the nut 103a which is secured to the attachment bracket 103, whereby the attachment bracket 139 and the attachment piece portion 132A can be attached to the attachment bracket 103, and the protecting cover 133 can also easily be attached to the attachment bracket 103 which constitutes the housing part P together with the airbag 115.

In addition, in the airbag apparatus M2 of the second embodiment, since the protecting cover 133 is configured such that the locking projection 136a which protrudes from the tongue piece 136 is locked in the locking hole 141c formed in the internal plate portion 141 while the tongue piece 136 is being held between the external plate portion 140 and the internal plate portion 141, the protecting cover 133, which is assembled to the airbag 115, do not move to deviate largely relative to the airbag 115 and the attachment bracket 139, and the assembled state can be held stably. Furthermore, even in the event that a force which attempts to remove the tongue piece 136 from the attachment bracket 139 is applied to the cover portion 134 in association with the inflation of the airbag main body 116 when the airbag main body 116 deploys and inflates, since the locking projection 136a is locked on the peripheral edge of the locking hole 141c so that the tongue piece 136 is not allowed to be dislodged from between the external plate portion 140 and the internal plate portion 141, the scattering of the protecting cover 133 can be suppressed which would otherwise occur as a result of the dislodgement of the cover.

Consequently, according to the airbag apparatus M2 of the second embodiment, even in the construction is adopted in which the protecting cover 133 made of a synthetic resin is provided around the periphery of the folded airbag 115, the protecting cover and the airbag can easily be integrated with each other prior to attachment to the vehicle V to thereby make it easy to handle them including transportation thereof, and additionally, the protecting cover and the airbag so integrated can also easily be attached to the vehicle V, and furthermore, the scattering of the protecting cover 133 can be prevented even when the system is activated after attachment.

Note that while, the second embodiment adopts the construction in which the protecting cover 133 partially covers the periphery of the folded airbag main body 116, a cover which covers almost the full periphery of the folded airbag may be used as a protecting cover.

According to the second embodiment of the invention, there is provided an airbag apparatus comprising an airbag which is folded up to be housed at a housing part of a vehicle so as to deploy and inflate to protrude from the housing part when an inflating gas is introduced thereinto, wherein the airbag comprises an attachment piece portion which protrudes from a folded airbag main body and has an attachment hole for attaching the airbag to the housing part, wherein a pair of wear plates made of sheets metal are disposed on front and rear sides of the attachment piece portion and are attached to the attachment piece portion by being crimped to each other so as to form concavities and convexities, and wherein the airbag is attached to the housing part by a securing structure which passes through attachment holes provided in the wear plates and the attachment hole in the attachment piece portion in such state that the folded airbag main body is covered by a protection cover of a synthetic resin and that the wear plates are applied to the housing part, the airbag apparatus being characterized in that the protection cover comprises:

a cover portion which covers the folded airbag main body;

a insertion hole in the cover portion which allows the passage of the attachment piece portion of the airbag therethrough;

a tongue piece which extends from a peripheral edge of the insertion hole and which is disposed so as to be held between the pair of wear plates when the wear plates are crimped; and a locking projection which is provided so as to protrude from the tongue piece; wherein a locking hole in which the locking projection is locked is formed in one of the pair of wear plates.

Third Embodiment

Figure 12:
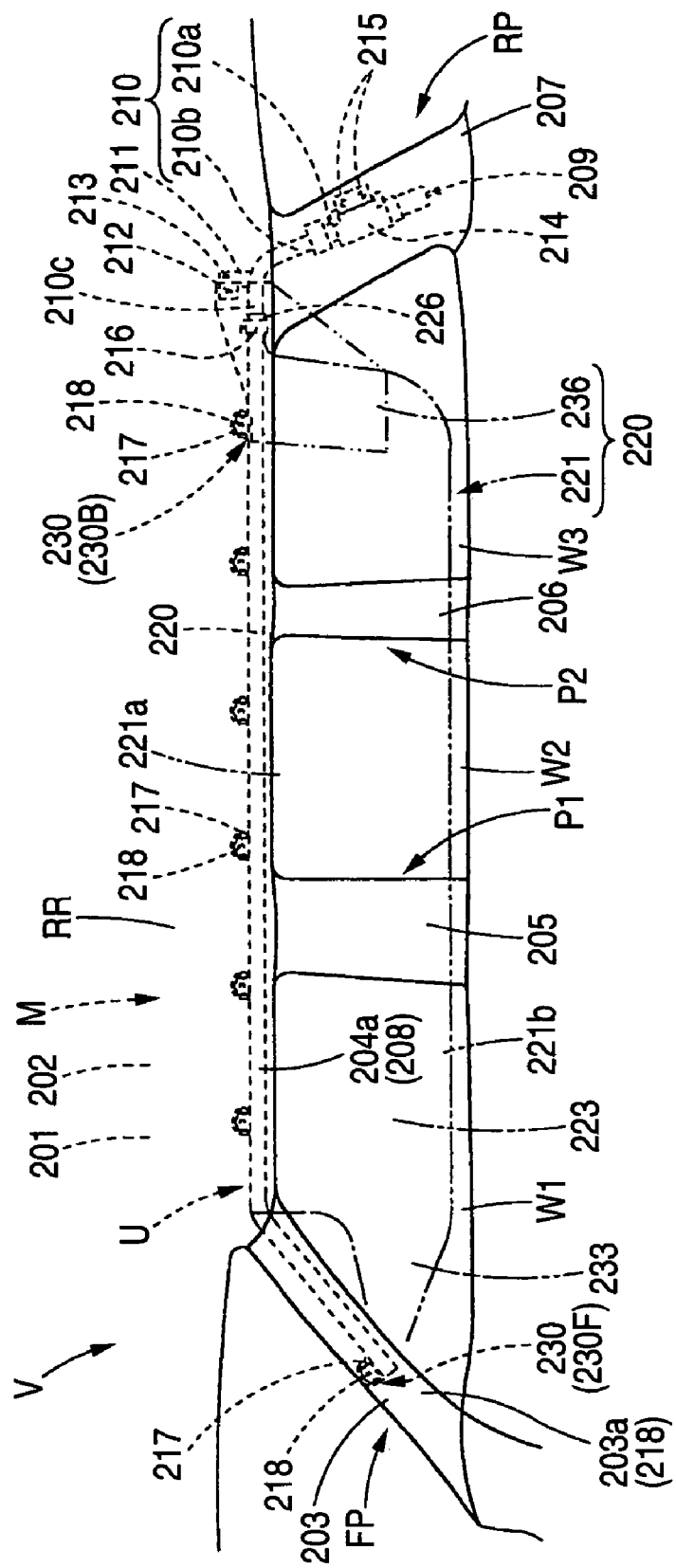
FIG. 12 is a drawing as seen from a compartment which shows a state in which a head-protecting airbag apparatus of a third embodiment of the invention is installed on to a vehicle.

To describe an third embodiment of the invention below based on the drawings, as shown in FIG. 12, an airbag apparatus M3 of the third embodiment is a head protecting airbag apparatus M3 which is configured to include a head protecting airbag 220 which can cover windows (side windows) W1, W2, W3 of a vehicle V when the airbag 220 deploys and inflates completely. Upper parts of the windows W1, W2, W3 functioning as a housing part U, the airbag 220 is folded up to be housed in a range from a front pillar portion FP to a position on a roof side rail portion RR which is near above a rear pillar portion RP. Note that this vehicle is made as a vehicle of a three-row-seat type in which two intermediate pillar portions P1, P2 which extend in a substantially vertical direction are provided between the front pillar portion FP and the rear pillar portion RP and seats are provided, respectively, at interior sides of the respective windows W1, W2, W3, and the airbag 220 is designed to cover not only the windows W1, W2, W3 but also interior sides of pillar garnishes 205, 206 of the pillar portions P1, P2.

As shown in FIG. 12, the head protecting airbag apparatus M3 is configured to include the airbag 220, an inflator 210 for supplying an inflating gas for the airbag 220, attachment brackets 214, 217, attachment bolts 213, 215, 218 and a clamp 216. The airbag 220, which is folded up, and the inflator 210 are housed while being covered by an airbag cover 208 on interior sides thereof when installed on to the vehicle V. In the case of this embodiment, the airbag cover 208 is provided with a lower edge 203a of a front pillar garnish 203 which covers an interior side of the front pillar portion FP and a lower edge 204a of a roof lining 204 which covers an interior side of the roof side rail portion RR.

The front pillar garnish 203 and the roof lining 204 are made of resin and are attached to an interior side of an inner panel 202, which is a member on the side of a body 201, with an attachment means, not shown. Then, the airbag cover 208, which is provided with these lower edges 203a, 204a, is designed to be pressed open to a compartment at a side thereof which faces the lower edges 203a, 204a by the airbag 220.

Figure 14:
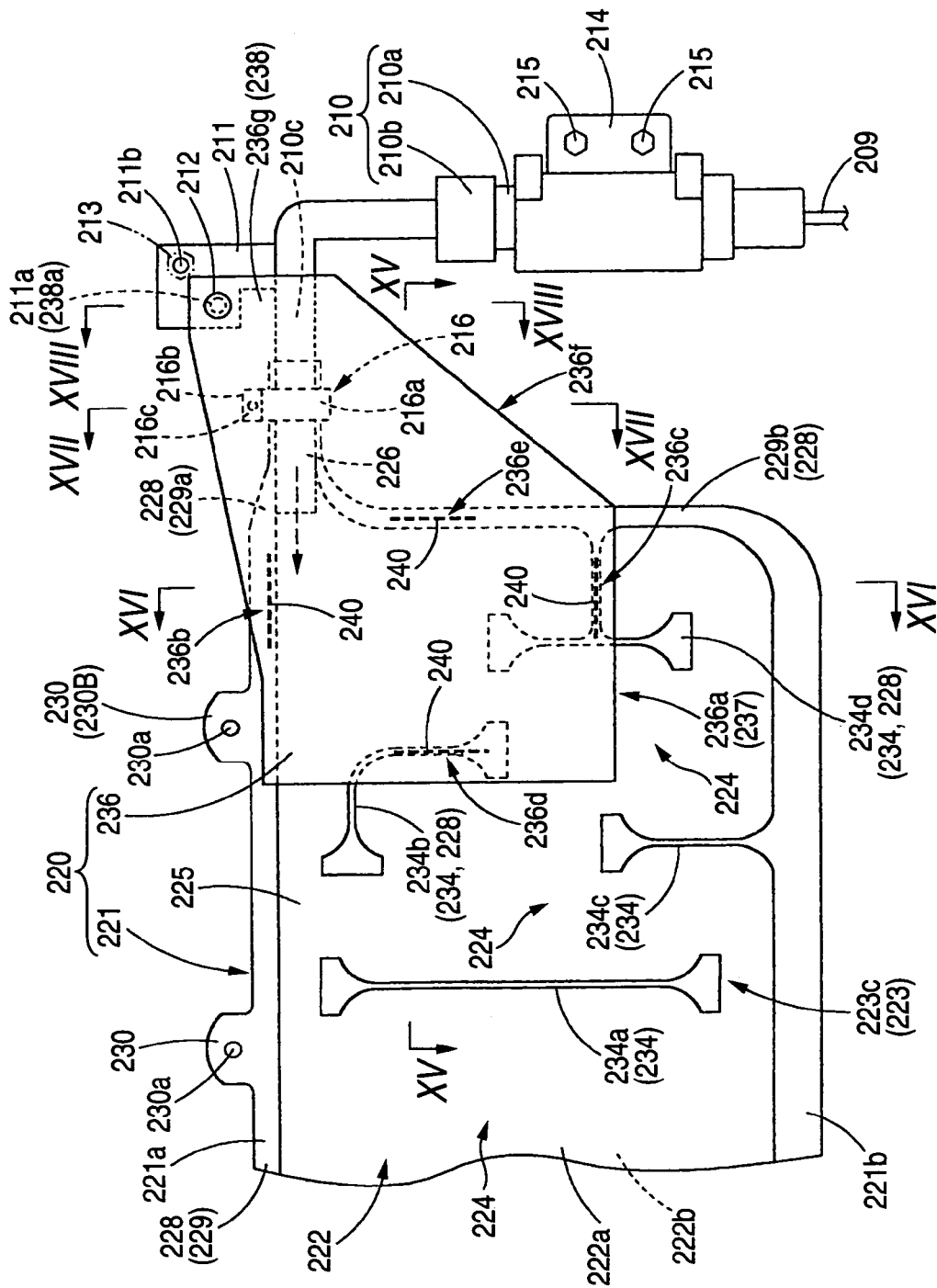
FIG. 14 is a partial front view which shows how the airbag main body, the reinforcement cloths and an inflator which are used in the third embodiment are installed.
Figure 15:
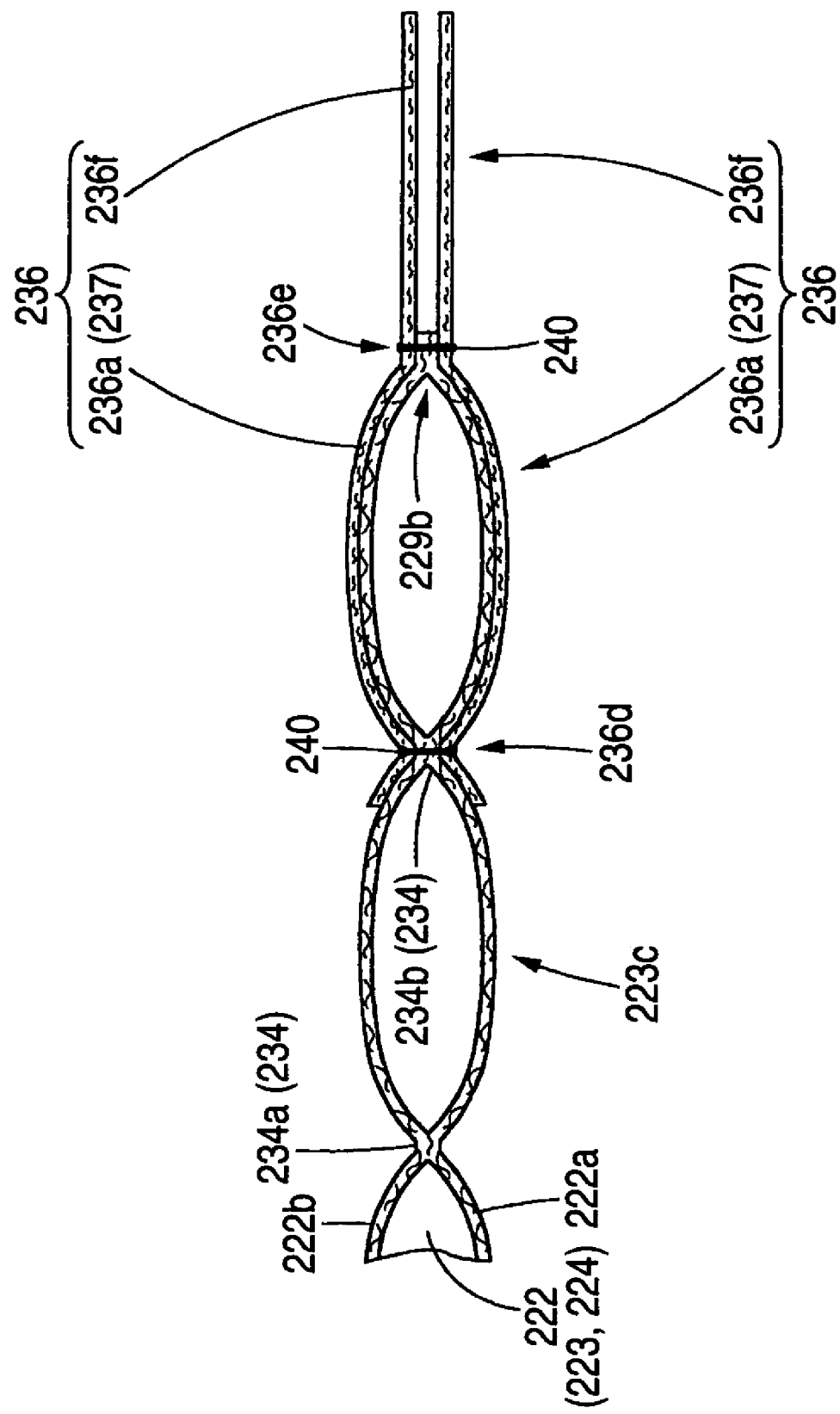
FIG. 15 is a schematic sectional view at a part indicated by the line XV—XV in FIG. 14.
Figure 16:
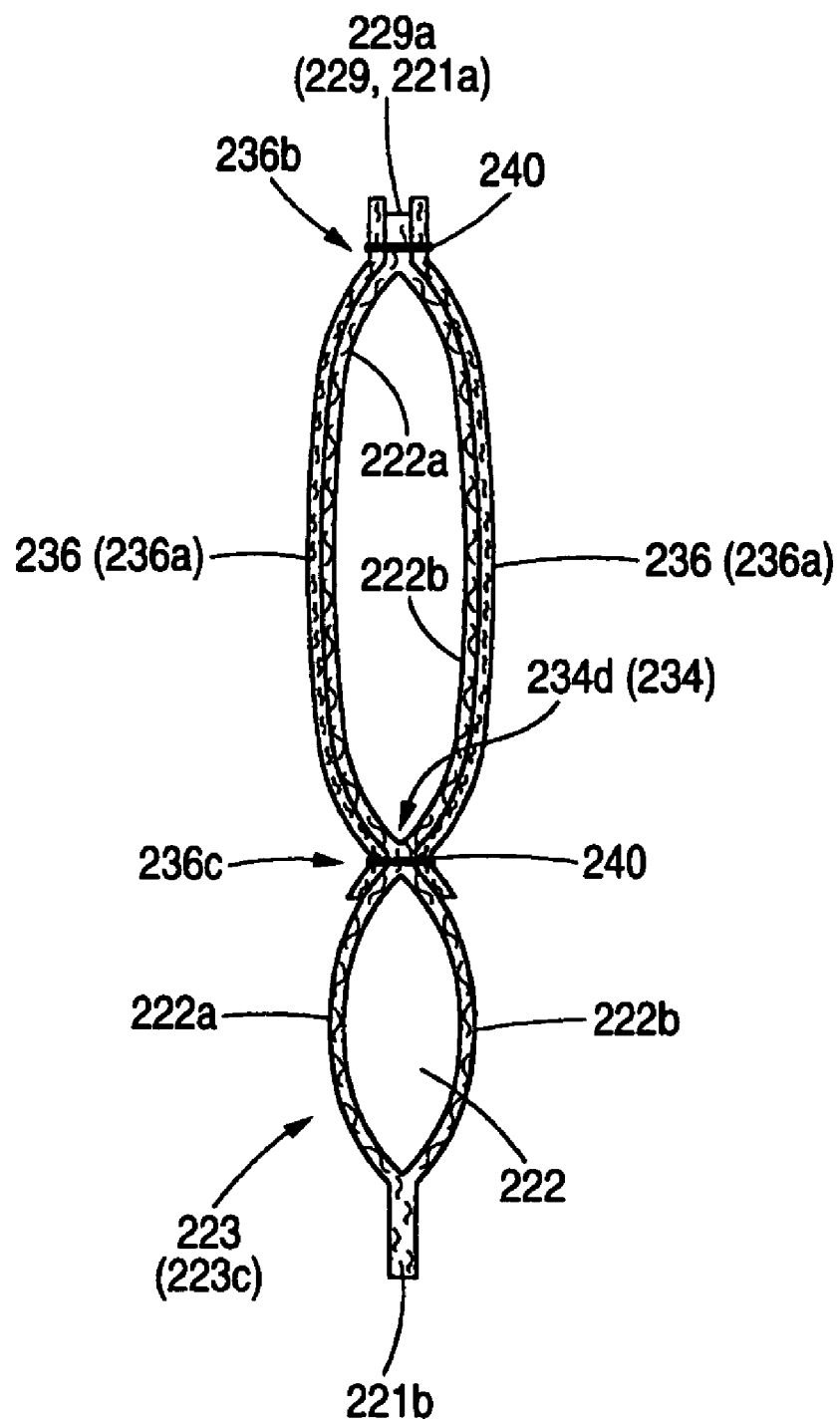
FIG. 16 is a schematic sectional view at a part indicated by the line XVI—XVI in FIG. 14.

The inflator 210 is, as shown in FIGS. 12 and 14, provided with a substantially cylindrical main body 210a and a diffuser 210b constituted by a curved metallic pipe and connected to a distal end (an upper end) of the main body 210a and is constructed so as to discharge an inflating gas generated in the main body 210a from the diffuser 210b at the distal end 210c when activated. Then, the inflator 210 is connected to a connecting port portion 226 of the airbag 220 by inserting the distal end 210c extended toward the front of the diffuser into the connecting port portion 226 of the airbag 220 and fastening a clamp 216 externally installed on the connecting port portion 226 at a position near a rear end thereof (refer to FIG. 17). In addition, on the inflator 210, the main body 210a is held by an attachment bracket 214, and the bracket 214 is fixed to the inner panel 202 as part of the body 201 at the rear pillar portion RP using attachment bolts 215. In addition, at the diffuser 210b, an assembling portion in the form of a flat plate which protrudes upward is provided in the vicinity of the distal end 210c, and a bolt 213 is passed through an attachment hole 211b provided in the assembling portion 211 and is then fastened to the inner panel 202 as part of the body 201 at a position near above the rear pillar portion RP, whereby the inflator 210 is fixed to the inner panel 202 as part of the body 201.

Figure 18:
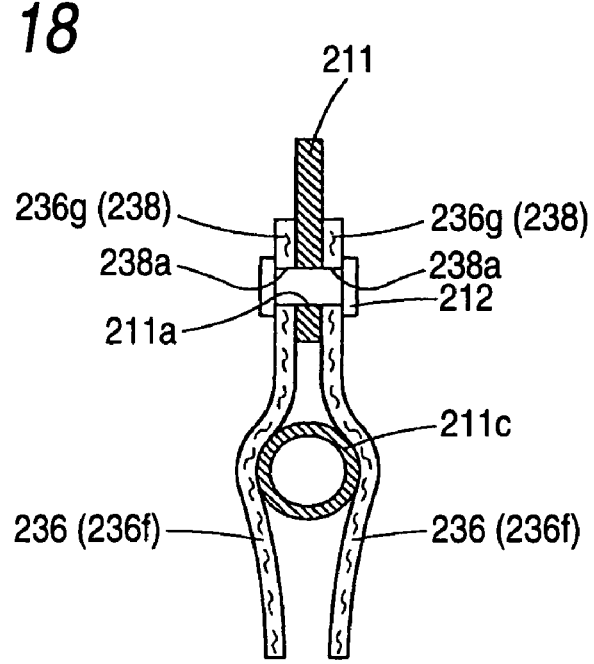
FIG. 18 is a schematic sectional view at a part indicated by the line XVIII-XVII in FIG. 14.

This assembling portion 211 is made as a part where an assembling attachment portion 238 of a reinforcement cloth 236 is fixed, and in addition to the attachment hole 211b, a fixing hole 211a is provided in the assembling portion 211 through which a rivet 212 is passed to fix the assembling attachment portion 238 to the assembling portion 211 (refer to FIG. 18).

Note that the installation of the inflator 210 on to the vehicle V is implemented in the form of an airbag assembly unit in which the inflator 210 and the airbag 220 are assembled together.

As shown in FIGS. 13 to 16, the airbag 220 is configured so as to include an airbag main body 221 which is formed as a tubular bag using polyamide threads or polyester threads and two reinforcement cloths 236 joined to the airbag main body 221 and made of a cloth material having a similar flexibility to that of the airbag main body 221.

The airbag main body 221 is configured so as to include a gas introducing portion 222 which is adapted to inflate, by introducing an inflating gas G thereinto, so as to separate from each other facing wall portions 222a, 222b which face the inside and outside of the vehicle and a non-introducing portion 228 which is formed so as to join the interior and exterior wall portions 222a, 222b to each other to thereby prohibit the introduction of inflating gas G thereinto. The gas introducing portion 222 is configured so as to include a protecting inflatable portion 223, a gas supply passage portion 225 and the connecting port portion 226, whereas the non-introducing portion 228 is configured so as to include a peripheral portion 229, attachment portions 230, plate-like portions 231, 232, 233 and thickness restricting portions 234.

The protecting inflatable portion 223 of the gas introducing portion 222 includes an inflatable area 223a which covers a window W3 at a side of a front seat, an inflatable area 223b which covers a window W2 at a side of a second-row seat and an inflatable area 223c which covers a window W3 at a side of a third-row seat, when the airbag main body 221 completes its deployment and inflation. In addition, the gas supply passage portion 225 is disposed so as to extend along the longitudinal direction on an upper edge 221*a* side of the airbag main body 221 to thereby establish a communication in upper portions of the respective inflatable areas 223*a*, 223*b*, 223*c*.

Figure 17:
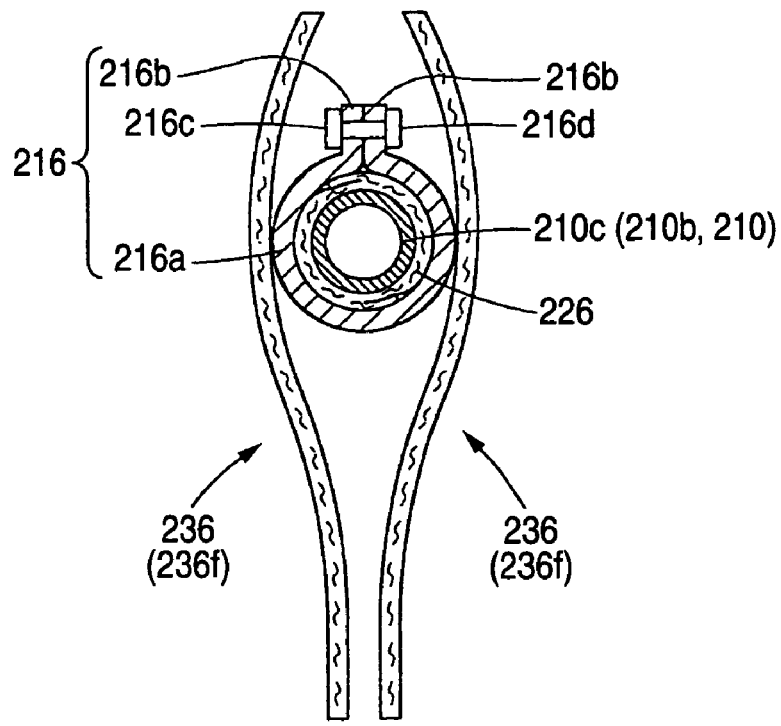
FIG. 17 is a schematic sectional view at a part indicated by the line XVII—XVII in FIG. 14.

Furthermore, the connecting port portion 226 is disposed so as to extend outward from one of longitudinal ends of the airbag main body 221 on the upper edge 221*a* thereof, in the case of the embodiment, rearward from a rear end of the main body 221 so that inflating gas G from the inflator 210 can be introduced into the gas supply passage portion 225, and the connecting port portion 226 is formed into a cylinder which opens at a rear end thereof so as to be externally installed on the distal end 210*c* of the diffuser 210*b* of the inflator 210. Then, the connecting port portion 226 is fastened by the clamp 216 in a state that the connecting port portion 226 is externally installed on the diffuser 210*b* to thereby be connected to the distal end 210*c* of the diffuser 210*b*. As shown in FIGS. 14 and 17, the clamp 216 is configured so as to include a cylindrical main body 216*a* on which flange portions 216*b*, 216*b* are disposed at circumferential ends thereof, and a nut 216*d* is fastened on a bolt 216*c* which is passed through the flanges 216*b*, 216*b* so as to make the flanges 216*b*, 216*b* approach each other so as to reduce an inside diameter of the cylindrical main body 216*a*, so that the connecting port portion 226 is brought into press contact with an outer circumferential surface of the diffuser distal end 210*c*, whereby the connecting port portion 226 is connected to the diffuser distal end 210*c*.

Figure 13:
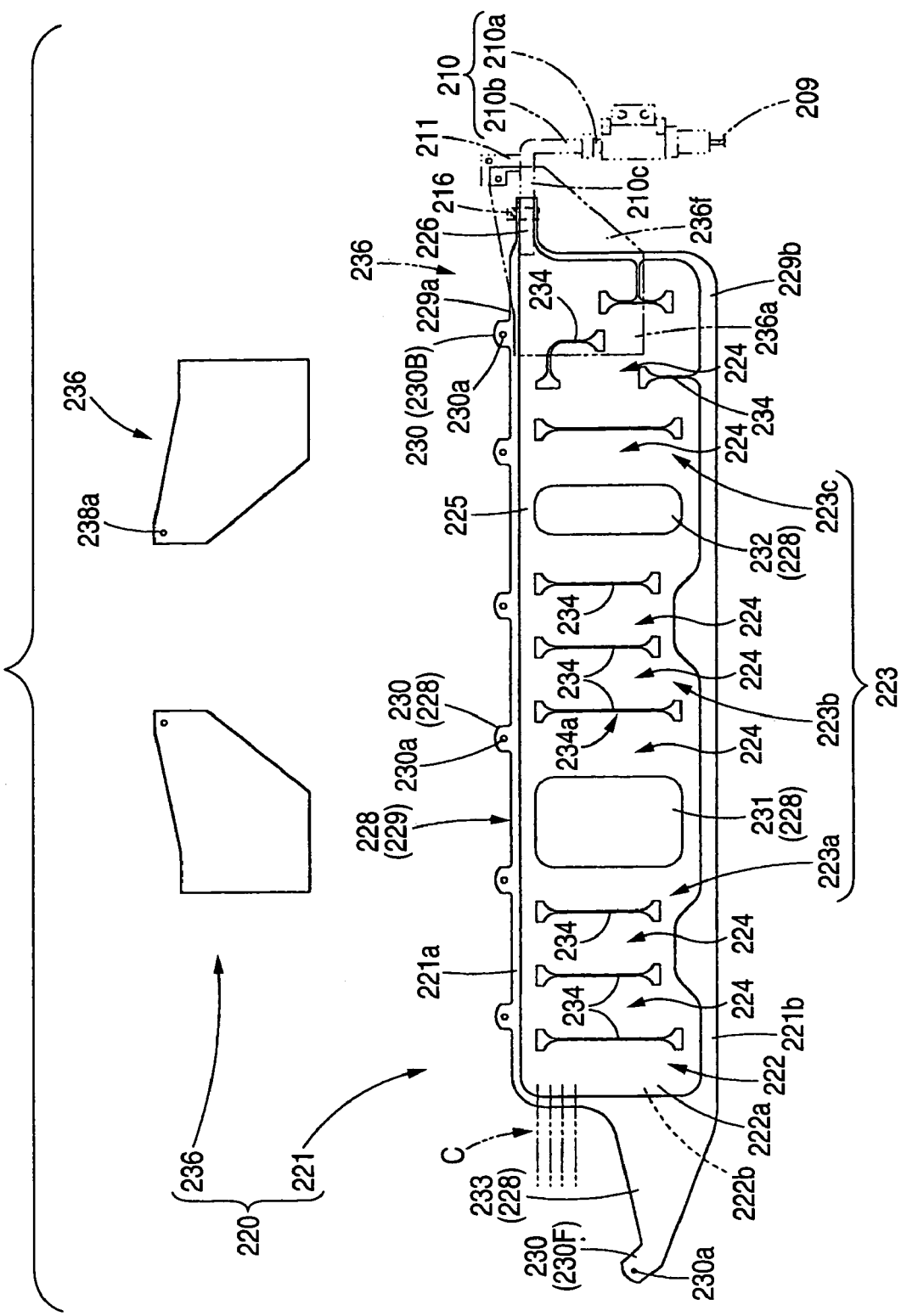
FIG. 13 is a development of an airbag main body and reinforcement cloths used in the third embodiment.

In addition, the respective inflatable areas 223*a*, 223*b*, 223*c* of the protecting inflatable portion 223 are configured to include a plurality of cells 224 which are, as shown in FIG. 13, partitioned by the thickness restricting portions 234 and the plate-like portions 231, 232 so as to be arranged in parallel along the longitudinal direction so that the airbag main body can narrow its width in the longitudinal direction and the plate-like shape which extends in the longitudinal direction can be maintained when the airbag inflates. Each cell 224 is arranged so as to extend in the vertical direction like a rod with an upper end thereof made to communicate with the gas supply passage portion 225.

The peripheral portion 229 of the non-introducing portion 228 is disposed on an outer peripheral edge of the gas introducing portion 222. The plate-like portion 231, 232 are positioned between the respective inflatable areas 223*a*, 223*b*, 223*c* locating below the gas supply passage portion 225 and are formed into rectangular plates, and the plate-like portion 233 is formed into a triangular plate that is disposed at a front end of the airbag main body 221. These plate-like portions 231, 232, 233 are provided in order to-secure the overall shape of the airbag main body 221 and to reduce the volumes of parts into which inflating gas G is introduced so as to reduce time from the initiation of inflation to the completion of inflation of the airbag main body 221 as much as possible.

As the thickness restricting portions 234 disposed between the respective cells 224, there are provided a thickness restricting portion 234*a* which is formed into a substantially I shape, a thickness restricting portion 234*b* which is formed into an inverted L-shape and thickness restricting portions 234*c*, 234*d* which are disposed in the vicinity of a rear end of the airbag main body 221 and are formed so as to be continued from a lower edge portion 229*c* and an edge 229*b* of the peripheral portion 229.

In addition, a plurality of attachment portions 230 are disposed on the upper edge 221*a* side of the airbag main body 221 including the plate-like portion 233 so as to protrude upward and include attachment holes 230*a* for fastening the airbag main body 221 to the inner panel 202 with bolts 218. An attachment bracket 217 is attached to each attachment portion 230*a* as a wear plate, and the attachment portion 230*a* is fastened to the inner panel 202 with the bolt 218 together with the bracket 217.

Then, as shown in FIGS. 13 to 18, the two reinforcement cloths 236, 236 are provided so as to be joined to the non-introducing portion 228 on a peripheral edge of the connecting port portion 226 in the vicinity of the rear end of the airbag main body 221. The shape of the reinforcement cloth 236 is, as shown in FIGS. 13, 14, configured to include a substantially rectangular front portion 236*a* and a trapezoidal rear portion 236*f* which is so formed by raising upward a side at a lower edge thereof from the substantially rectangular front portion 236*a*, and the substantially rectangular front portion 236*a* is made as a joining attachment portion (joining attachment portion) 237, whereas an upper end portion 236*g* of the rear portion 236*f* is made as an assembling attachment portion 238.

These attachment portions 237, 238 are disposed, respectively, at ends of positions on the connecting port portion 226 connected to the distal end 210*c* of the diffuser 210*b* which face each other in a dislodgement direction from the diffuser 210*b* (in the embodiment, in the longitudinal direction).

Then, the joining attachment portion 237 is disposed at a region defined by an area locating in front of the connecting port portion 226 and an area locating therebelow and is formed by sewing upper, lower, front and rear sides (edges) of parts 236*b*, 236*c*, 236*d*, 236*e* of the substantially rectangular portion 236*a* to an upper edge portion 229*b* and a rear edge portion 229*b* of the peripheral portion 229 and the thickness restricting portions 234*b*, 234*d*, respectively, using sewing threads 240.

On the other hand, the assembling attachment portion 238 is disposed at the upper end portion 236*g* of the rear portion 236 which constitutes a region which is rearward of the connecting port portion 226 and which deviates slightly upward, and a fixing hole 238*a* is provided therein.

Note that the position where the fixing hole 238*a* is disposed is such a position that coincides with the fixing hole 211*a* in the assembling portion 211 provided on the diffuser 210*b* in such states, as reference, that the joining attachment portion 237 is joined to the airbag main body 221 which is developed flat and that the connecting port portion 226 is connected to the inflator 210 using the clamp 216.

In addition, in the case of the embodiment, the two reinforcement cloths 236 are used as shown in FIGS. 15 to 18, and these two reinforcement cloths 236, 236 are provided by being joined together with the non-introducing portion 228 to the predetermined parts on the non-introducing portion 228 from the outsides of the interior and exterior wall portions 222*a*, 222*b* of the airbag main body 221 so as to hold the wall portions 222*a*, 222*b* therebetween.

To describe briefly a process of installing this head protecting airbag apparatus M3 on to the vehicle V, the airbag 220 is formed in advance by sewing the joining attachment portions 237 of the two reinforcement cloths 236, 236 together with the non-introducing portion 228 of the airbag main body 221 using the sewing threads 240 with the predetermined parts on the non-introducing portion 228 of the airbag main body 221 interposed therebetween, so that the joining attachment portions 237 of the reinforcement cloths 236, 236 are attached to the airbag main body 221. Then, the airbag 220 is folded up substantially vertically from a flat developed state thereof into a bellows while creating creases C (refer to FIG. 13) in parallel with the upper edge 221a such that the lower edge 221b side approaches the upper edge 221a side, and thereafter, a breakable wrapping material, not shown, is wound around the circumference of the airbag 220. Furthermore, the respective attachment portions 230 are pulled out so that the predetermined attachment brackets 217 are attached thereto, and the distal end 210c of the diffuser 210b of the inflator 210 in which the attachment bracket 214 has already been attached to the main body 210a thereof, is inserted into the connecting port portion 226, whereby the connecting port portion 226 is connected to the inflator 210 by the clamp 216. In addition, the rivet 212, which functions as the securing structure, is passed through the fixing holes 238a in the respective reinforcement cloths 236 and the fixing hole 211a in the assembling portion 211 for riveting them together, so that the assembling attachment portions 238 of the respective reinforcement cloths 236 are attached to the inflator 210, whereby the airbag assembly is formed. Then, the respective attachment brackets 214, 217 and the assembling portion 211 are disposed at the predetermined positions on the inner panel 202 and are fastened with the bolts 213, 215, 218, whereby the airbag assembly so formed can be installed on to the vehicle V.

Thereafter, a lead wire 209 extending from a control unit for controlling the operation of the inflator 210 is connected to the inflator 210, the front pillar garnish 203 and the roof lining 204 are attached to the inner panel 202 as part of the body 201, and furthermore, the pillar garnishes 205, 206 and the rear pillar garnish 207 are attached to the inner panel 202 as part of the vehicle 201, whereby the head protecting airbag apparatus M3 can be installed on to the vehicle V.

In the event that the inflator 210 is activated after the installation of the head protecting airbag apparatus M3 on to the vehicle V, since the inflating gas generated in the main body 210a of the inflator 210 is supplied to connecting port portion 226 side of the head protecting airbag 220, the airbag 220 introduces the inflating gas G from the connecting port portion 226 into the gas supply passage portion 225 and the plurality of cells 224, then pushes the airbag cover 208 open to deploy downward, and completes its deployment and inflation so as to cover the interior sides of the windows W1, W2, W3 and the pillar portions P1, P2 as indicated by chain double-dashed lines in FIG. 12.

Then, in the airbag apparatus M3 of the third embodiment, in the connecting construction between the connecting port portion 226 of the airbag 220 and the inflator 210, the connecting port portion 226 installed externally on the diffuser distal end 210c of the inflator 210 is connected to the inflator 210 by attaching the reinforcement cloths 236 which increases the connecting strength in addition to being fastened with the clamp 216.

This reinforcement cloth 236 includes the joining attachment portion 237 which is joined to the non-introducing portion 228 on the airbag main body 221 side and the assembling attachment portion 238 which is assembled to be fixed to the inflator 210 by making use of the rivet 212, and the joining attachment portion 238 and the assembling attachment portion 238 are made to face each other in the longitudinal direction which is the direction in which the connecting port portion 226 is dislodged from the inflator 210, whereby the dislodgement of the connecting port portion 226 from the inflator 210 can be resisted, thereby making it possible to increase the connection strength of the connecting port portion 226 to the inflator 210.

Then, since the reinforcement cloth 236 is joined to the airbag main body 221 at the joining attachment portion 237 and is flexible, the reinforcement cloth 236 can be folded up together with the airbag main body 221 and no problem is caused with handling the airbag when forming the airbag assembly unit. Of course, since the joining attachment portion 237 is joined to the non-introducing portion 228 of the airbag main body 221 which prohibits the introduction of the inflating gas G thereinto, there is caused no gas leakage from the airbag main body 221 when it inflates.

In addition, in the event that the joining attachment portion 237 is joined to the airbag main body 221, since the assembling attachment portion 238 only has to be assembled and fixed to the inflator 210 side at the same time that the clamp 216 is fastened when connected to the inflator 210 after the reinforcement cloth 236 has been folded up together with the airbag main body 221, the airbag 220 on which the reinforcement cloths 236 are provided and the inflator 210 can be assembled together in advance as the airbag assembly unit before the installation on to the vehicle V, and the increase in the number of man hours required for assembling the airbag apparatus M3 can be suppressed.

Consequently, in the airbag apparatus M3 according to the invention, even in the event that the construction is adopted in which the connecting port portion 226 of the airbag 220 is connected to the inflator 210 by making use of the clamp 216, there is caused no problem in handling the airbag 220, and the increase in the number of man hours required for assembling the airbag apparatus M3 can be suppressed, thereby making it possible to increase the connection strength.

Then, in the embodiment, the reinforcement cloths 236, 236 are disposed so as to be superposed on the non-introducing portion 228 from the sides which holds the interior and exterior wall portions 222a, 222b of the airbag main body 221 when it deploys and inflates, and the reinforcement cloths 236, 236 so superposed and the non-introducing portion 228 are joined together, whereby the joining attachment portion 237 is formed. In the event that the joining attachment portions 237 of the reinforcement cloths 236, 236 are constructed into the double-layer structure, the connecting strength can further be increased, and hence the invention can preferably be applied to the head protecting airbag 220 in which the connecting port portion 226 is disposed at one of the end portions of the airbag main body 221 which is elongated in the longitudinal direction.

Namely, in a longitudinally elongated head protecting airbag 220 such as one adapted to be installed on the three-row seat type vehicle V as in the case with the third embodiment, since the inflating gas G introduced from the connecting port 226 is introduced into the airbag main body 221 along the axial direction of the connecting port portion 226 and the volume of the airbag main body 221 is large, while the connecting port 226 becomes easier to be dislodged from the inflator 210, the dislodgement can be resisted strongly by the reinforcement cloths 236 which are superposed double.

In addition, in the third embodiment, the non-introducing portion 228 is configured to include the peripheral portion 229 which is disposed around the outer peripheral edge of the airbag main body 221 and the thickness restricting portions 234 which are disposed in the inflatable areas of the airbag main body which locate further inward than the peripheral portion 229, and the joining (sewing) parts of the joining attachment portion 237 are disposed not only at the parts 236b, 236e of the upper and rear edge portions 229a, 229b of the peripheral portion 229 but also at the parts 236d, 236c of the thickness restricting portions 234b, 234d, whereby the front portion 236a of the reinforcement cloth 236 is provided so as to cover the inflatable area of the airbag main body 221 from the position near the connecting port portion 226 to the position near the thickness restricting portions 234b, 234d, in the case of the third embodiment, so as to cover substantially the whole area of the rear upper side of the rear inflatable area 223c.

In the configuration like this, when the inflating gas G is introduced in the airbag main body 221 from the connecting port portion 226, while both the facing wall portions 222a, 222b in the vicinity of the thickness restricting portions 234b, 234d of the airbag main body 221 which locate on the peripheral edge of the connecting port portion 226 inflate outward drastically, in the event that the reinforcement cloth 236 is disposed at the outside of both the wall portions 222a, 222b in the vicinity of the thickness restricting portions 234b, 234d, a protection against the interference with peripheral components on both the wall portions 222a, 222b in that area can be realized.

Furthermore, in the head protecting airbag 220 in which the connecting port portion 226 is disposed at one of the end portions of the longitudinally elongated airbag main body 220, normally, the plurality of the cells 224 are provided in parallel in the longitudinal direction so that a tension is generated on the lower edge of the airbag main body 220 which has completed its deployment and inflation so as to be exerted along the longitudinal direction so as to secure an occupant restraining performance of restraining an occupant within the compartment even in the event that the airbag main body 220 interferes with the occupant who is forced to move to the outside of the vehicle, and the attachment portion 230F (refer to FIG. 12) at one of the longitudinal end portions (in this embodiment, one at the front end) of the airbag main body 221 is attached to the vicinity of the lower portion of the pillar portion FP.

Then, in the third embodiment, the assembling attachment portion 238 of the reinforcement cloth 236 is attached to the assembling portion 211 of the inflator 210 at the rear end of the connecting port portion 226 which is the end locating far away from the attachment portion 230F, and the joining attachment portion 237 of the reinforcement cloth 236 itself is disposed at the thickness restricting portions 234b, 234d of the inflatable area 223c. Namely, in the case of the third embodiment, the fixing point to the body 201 side of the vehicle V which locates on the side of the airbag main body 221 which faces the connecting port portion 226 can actually be displaced toward the part further rearward than the inflator 210 than the attachment portion 230B (refer to FIG. 12) on the side of the airbag main body 221 itself which faces the body 201 side, and the reinforcement cloth 236 pulls the thickness restricting portions 234b, 234d which are situated downward, that is, further inward into the airbag main body than the upper edge 221b side of the airbag main body to the rear of the inflator 210 by the joining parts 236d, 236c of the joining attachment portion 237, whereby a tension of large magnitude which is exerted toward the rear of the inflator 210 is generated more, thereby making it possible to increase the occupant restraining performance of the head protecting airbag 220.

In addition, in the case of the third embodiment, since the joining attachment portion 237 includes, as the joining parts to the airbag main body 221, not only the joining parts 236d, 236c to the thickness restricting portions 234b, 234d but also the joining parts 236b, 236e to the peripheral portion 229, the attaching strength is increased, and even in case the reinforcement cloth 236 generates a tension of large magnitude, the reinforcement cloth 236 can remain attached to the airbag main body 221 in a stable fashion.

Note that while, in the embodiment, the assembling attachment portion 238 is attached to the assembling portion 211 of the inflator 210 by providing the fixing holes 238a, 211a in the reinforcement cloth 236 and the inflator 210 and passing the rivet 212 through these fixing holes 238a, 211a, a configuration may be adopted in which in place of the rivet 212, a fixing structure such as a clip and a bolt is passed through the fixing holes 238a, 211a so as to attach the assembling attachment portion 238 to the inflator 210, or provided that the joining attachment portion 237 can be fastened so as not to be moved in the dislodgement direction of the connecting port portion 226, the assembling attachment portion 238 may be attached to the inflator 210 by being wound around a corresponding locking portion on the inflator 210 or by being fastened together with the inflator 210.

Figure 19:
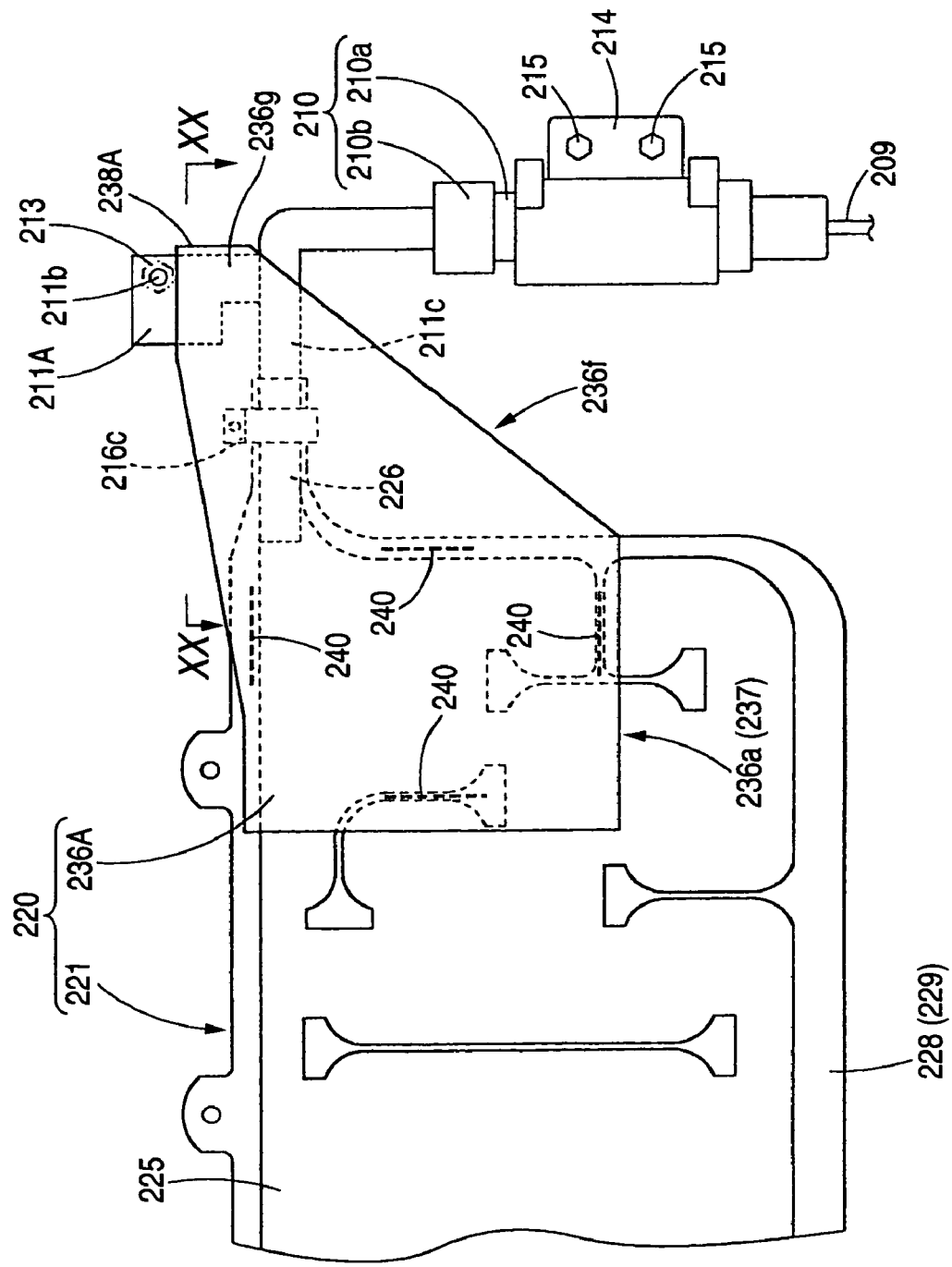
FIG. 19 is a partial front view which shows how an airbag main body, reinforcement cloths and an inflator which are used in a modification of the third embodiment are installed.
Figure 20:
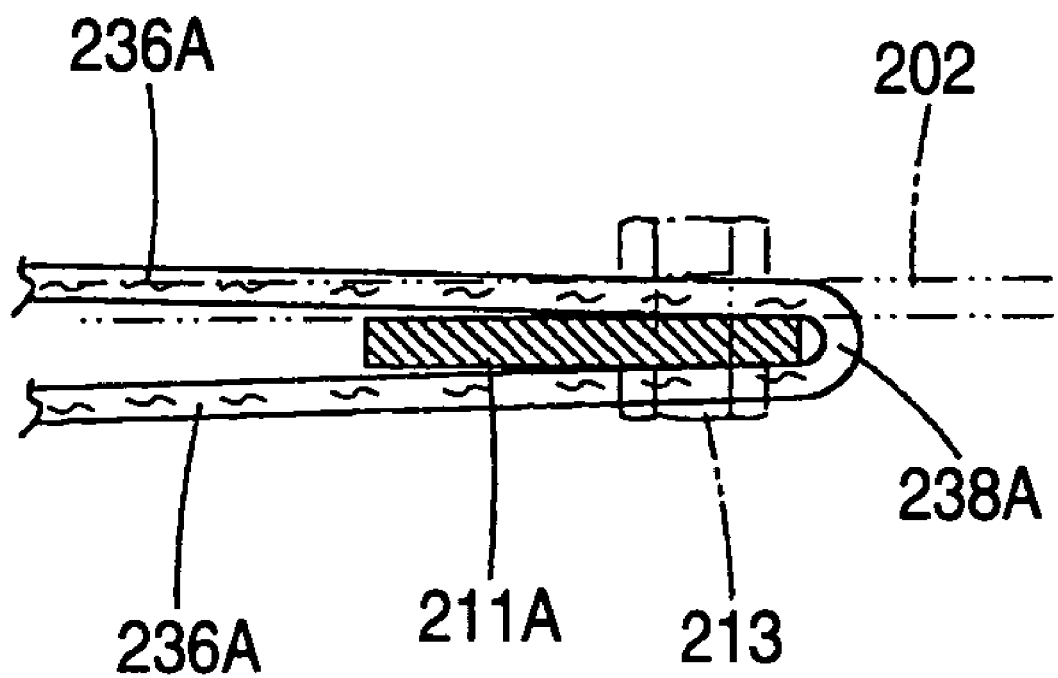
FIG. 20 is a schematic sectional view of a part indicated by the line XX—XX in FIG. 19.

Incidentally, a reinforcement cloth 236A shown in FIGS. 19, 20, is such that two reinforcement cloths 236A, which are superposed on each other, is joined together at the rear thereof, and the part where the reinforcement cloths 236A are made to continue to each other is wound around an assembling portion 211A as a locking part which constitutes an assembling attachment portion 238A, so that the assembling attachment portion 238A is attached to the inflator 210.

Furthermore, the assembling attachment portion 238 of the reinforcement cloth 236 may be fastened together with the assembling portion 211 to the inflator 210 with the bolt 213 when the assembling portion 211 is fastened by the bolt 213 at the time of installation of the inflator 210 to the vehicle V.

Furthermore, while, in the third embodiment, the joining attachment portion 237 of the reinforcement cloth 236 is described as being joined to the airbag main body 221 through sewing by making use of the sewing threads 240, the joining attachment portion 237 may be attached to the airbag main body 221 by making use of an adhesive.

Note that while, in the third embodiment, the connecting port portion 226 of the airbag main body 221 of the head protecting airbag 220 is disposed at the rear end side of the airbag main body 221 so as to correspond to the position where the inflator 210 is disposed, in the event that the inflator 210 is disposed on the front side of the vehicle, the reinforcement cloths 236 and the relevant associated components may be reversed longitudinally so as to correspond to the inflator so disposed.

In addition, while, in the embodiment, the reinforcement cloths 236 are described as being disposed on both the interior and external sides of the airbag main body 221, the reinforcement cloth 236 may be disposed only on one of the interior and external sides thereof.

According to the third embodiment of the invention, there is provided an airbag apparatus including an airbag which is folded up to be housed at a housing part of a vehicle so as to protrude from the housing part for deployment and inflation by introducing an inflating gas thereinto and an inflator for supplying the inflating gas for the airbag, the airbag having for introduction of the inflating gas from the inflator thereinto a cylindrical connecting port portion which is installed externally on the inflator and is connected to the inflator by being fastened by a clamp; wherein the airbag has an airbag main body having the connecting port portion and adapted to deploy and inflate by allowing the inflating gas to be introduced thereinto and a flexible reinforcement cloth for increasing the connection strength between the connecting port portion and the inflator, wherein the airbag main body includes a gas introducing portion which inflates so as to separate facing wall portions from each other when the inflating gas is introduced thereinto and a non-introducing portion which joins the facing wall portions to each other so as to prohibit the introduction of the inflating gas, and wherein the reinforcement cloth includes end portions disposed at positions on the connecting port portion externally installed on the inflator which face each other along a dislodgement direction from the inflator, one of which end portions is provided as a joining attachment portion which is joined to the non-introducing portion at a peripheral edge of the connecting port portion of the airbag main body, whereas the other end portion is provided as an assembling attachment portion which is assembled to be fixed to the inflator.

Then, in the event that the airbag is configured as a head protecting airbag in which the facing wall portions of the gas introducing portion constitute an interior wall portion and an exterior wall portion which are to be positioned, respectively, inside a compartment and outside the compartment when the airbag deploys and inflates completely and which is housed at an upper part of a window of a vehicle so as to protrude downward so as to cover an interior side of the window when the airbag deploys and inflates and the connecting port portion is disposed at one of longitudinal end portions of the airbag main body which deploys and inflates so as to cover the window, the following configuration may be adopted. Namely, the reinforcement cloth is disposed so as to be superposed over the non-introducing portion from both sides which are such as to hold the interior and exterior wall portions of the airbag main body when the airbag bodydeploys and inflates, where by the joining attachment portion is formed by joining together the reinforcement cloth so superposed and the non-introducing portion.

In addition, while the foregoing embodiments have been described by taking the head protecting airbag apparatuses as example, airbag apparatuses to which the invention can be applied are not limited thereto, and the invention may be applied to, for example, a side airbag apparatus or knee protection air bag.

Particularly, the third embodiment is applicable to a knee protecting airbag, provided that the airbag is such as to include the connecting port portion that is attached to the inflator using the clamp. Furthermore, the invention can be applied not only to the airbag in which the connecting port portion is disposed at only at one of the end portions such as at the rear end of the airbag main body but also to an airbag in which the connecting port portion is provided at a longitudinally or vertically intermediate part of the outer peripheral edge of the airbag main body.

What is claimed is:

1. An airbag apparatus mounted in a vehicle, comprising:
an airbag folded and housed in a housing part of the vehicle, the airbag being including
a gas introducing portion which inflates to separate an interior wall portion and an exterior wall portion from each other by introducing an inflating gas thereinto, the gas introducing portion including
a gas supply passage portion which is extended along a longitudinal direction at an upper edge of the airbag so as to communicate with a connecting port portion connected to an inflator for supplying the inflating gas, and
a plurality of parallel cells arranged substantially in parallel with each other in the longitudinal direction so as to extend downward, each of which has an inflating gas inlet port at an upper portion side thereof facing the gas supply passage portion; and
a non-introducing portion which keeps the interior and exterior wall portions joined to each other so as not to allow the inflating gas to be introduced thereinto, the non-introducing portion including
a peripheral portion which defines an outer peripheral edge of the airbag, and
extending partitioning portions which extend upward from a lower edge portion of the peripheral portion to partition the parallel cells,
wherein the parallel cells include a quick deployable cell which has a downstream side extending partitioning portion which locates at a downstream side in an inflating gas flow and an upstream side extending partitioning portion which locates at an upstream side in the inflating gas flow, so that the quid deployable cell is capable of deploying quickly.

2. An airbag apparatus according to claim 1, wherein the downstream side extending partitioning portion has a vertical portion which extends upward from the lower edge portion, and a horizontal portion which is disposed to curve from an upper end of the vertical portion along a lower edge of the gas supply passage portion so as to cover an upper end of the quick deployable cell.

3. An airbag apparatus according to claim 1, wherein the upstream side extending partitioning portion is arranged such that an upper end thereof which extends upward from the lower edge portion is disposed so as to form an inlet port between a distal end of the horizontal portion of the downstream side extending partitioning portion.

4. An airbag apparatus according to claim 1, wherein the airbag is folded up and housed in an upper part of a window of the vehicle, and is deployed downward from the upper part of the window so as to cover an interior side of the window when an inflating gas is introduced thereinto.

* * * * *